(12) United States Patent
Yagi et al.

(10) Patent No.: US 11,392,260 B2
(45) Date of Patent: Jul. 19, 2022

(54) DISPLAY CONTROL DEVICE, DISPLAY CONTROL METHOD, AND DISPLAY CONTROL PROGRAM

(71) Applicant: Nippon Telegraph and Telephone Corporation, Tokyo (JP)

(72) Inventors: Sayaka Yagi, Tokyo (JP); Kimio Tsuchikawa, Tokyo (JP); Takeshi Masuda, Tokyo (JP); Yuki Urabe, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/290,809

(22) PCT Filed: Oct. 24, 2019

(86) PCT No.: PCT/JP2019/041657
§ 371 (c)(1),
(2) Date: May 3, 2021

(87) PCT Pub. No.: WO2020/095695
PCT Pub. Date: May 14, 2020

(65) Prior Publication Data
US 2021/0405827 A1     Dec. 30, 2021

(30) Foreign Application Priority Data
Nov. 7, 2018    (JP) .............................. JP2018-209772

(51) Int. Cl.
*G06F 3/0481*      (2022.01)
*G06F 9/451*       (2018.01)
(Continued)

(52) U.S. Cl.
CPC .............. *G06F 3/0481* (2013.01); *G06F 3/14* (2013.01); *G06F 9/452* (2018.02); *G06T 11/203* (2013.01)

(58) Field of Classification Search
CPC .......... G06F 7/552; G06F 7/523; G06F 7/537; G06F 7/5525; G06F 2207/5351; G06F 7/4873; G06F 7/535
See application file for complete search history.

(56) References Cited

U.S. PATENT DOCUMENTS

| | | | |
|---|---|---|---|
| 2008/0177623 A1* | 7/2008 | Fritsch | G06Q 10/10 705/7.27 |
| 2013/0110588 A1* | 5/2013 | Livne | G06Q 10/06 705/7.38 |
| 2017/0097973 A1* | 4/2017 | Iannaccone | H04L 67/1095 |

OTHER PUBLICATIONS

Xerxes P. Kotval et al.,. Visualization of Entities Within Social Media: Toward Understanding Users' Needs, Mar. 1, 2013, Bell Labs Technical Journal, pp. 77-101 (Year: 2013).*

(Continued)

*Primary Examiner* — Tam T Tran
(74) *Attorney, Agent, or Firm* — Fish & Richardson P.C.

(57) ABSTRACT

A display control device includes a conversion unit which, upon receipt of an operation log file including operation logs that indicate the content of operations performed on windows on a terminal screen, determines data variables representing window states of the windows indicated by each of the operation logs on the basis of a window state setting for setting a window state on the terminal screen, a display control unit that sets correspondence relationships between the data variables and visual variables, generates rectangular objects corresponding to the data variables, and determines attribute values of the rectangular objects on the basis of the visual variables associated with the data variables, and a visualization unit that performs drawing on the basis of sets (Continued)

of the rectangular objects and the attribute values determined by the display control unit.

18 Claims, 41 Drawing Sheets

(51) Int. Cl.
    *G06F 3/14*         (2006.01)
    *G06T 11/20*      (2006.01)

(56) References Cited

OTHER PUBLICATIONS

Miguel Aniceta et al., Browsing Multidimensional Visual Entities, Jul. 1, 2016, IEEE Xplore, pp. 146-151 (Year: 2016).*

Grossman et al., "Chronicle: Capture, Exploration, and Playback of Document Workflow Histories," Proceedings of the 23nd annual ACM symposium on User interface software and technology, Oct. 2010, pp. 143-152.

Persol-pt.co.jp, [online], "MiTERAS," Jul. 2018, retrieved on Oct. 2, 2018, retrieved from URL<https://www.persol-pt.co.jp/miteras/work-visible/>, 15 pages (with English Translation).

Verint.com, [online], "Desktop and Process Analytics," 2018, retrieved on Oct. 3, 2018, retrieved from URL<https://www.verint.com/engagement/our-offerings/solutions/workforce-optimization/desktop-and-process-analytics/index.html>, 7 pages.

* cited by examiner

Fig. 7

| START TIME | END TIME | WINDOW HANDLE | WINDOW TITLE | exe NAME | URL/PATH NAME | |
|---|---|---|---|---|---|---|
| 2018/9/25 10:15:23 | 2018/9/25 10:19:10 | 263856 | ORDER LIST | C:¥Program Files¥Internet Explorer¥iexplore.exe | https://sample.com/order-system | }T1 |
| 2018/9/25 10:19:10 | 2018/9/25 10:22:08 | 328162 | ORDER DETAILS | C:¥Program Files¥Internet Explorer¥iexplore.exe | https://sample.com/order-system/detail | }T2 |
| 2018/9/25 10:22:08 | 2018/9/25 10:24:44 | 659481 | SPECIAL ORDER LIST.xlsx | C:¥Program Files¥Microsoft Office¥Office14¥EXCEL.EXE | C:¥Users¥yagi¥moushikomi¥SPECIAL ORDER LIST.xlsx | }T3 |
| 2018/9/25 10:24:44 | 2018/9/25 10:29:01 | 328162 | ORDER DETAILS | C:¥Program Files¥Internet Explorer¥iexplore.exe | https://sample.com/order-system/detail | }T4 |
| 2018/9/25 10:29:01 | 2018/9/25 10:34:52 | 263856 | ORDER LIST | C:¥Program Files¥Internet Explorer¥iexplore.exe | https://sample.com/order-system | }T5 |

| START TIME | END TIME | WINDOW HANDLE | WINDOW TITLE | exe NAME | URL/PATH NAME | WINDOW EXPOSURE RATIO |
|---|---|---|---|---|---|---|
| 2018/9/25 10:15:23 | 2018/9/25 10:19:10 | 263856 | ORDER LIST | C:\Program Files\Internet Explorer\iexplore.exe | https://sample.com/order-system | 100.0 |
| 2018/9/25 10:19:10 | 2018/9/25 10:22:08 | 328162 | ORDER DETAILS | C:\Program Files\Internet Explorer\iexplore.exe | https://sample.com/order-system/detail | 100.0 |
| 2018/9/25 10:19:10 | 2018/9/25 10:22:08 | 263856 | ORDER LIST | C:\Program Files\Internet Explorer\iexplore.exe | https://sample.com/order-system | 66.9 |
| 2018/9/25 10:22:08 | 2018/9/25 10:24:44 | 659481 | SPECIAL ORDER LIST.xlsx | C:\Program Files\Microsoft Office\Office14\EXCEL.EXE | C:\Users\yagi\moushikomi\SPECIAL ORDER LIST.xlsx | 100.0 |
| 2018/9/25 10:22:08 | 2018/9/25 10:24:44 | 328162 | ORDER DETAILS | C:\Program Files\Internet Explorer\iexplore.exe | https://sample.com/order-system/detail | 76.1 |
| 2018/9/25 10:22:08 | 2018/9/25 10:29:01 | 263856 | ORDER LIST | C:\Program Files\Internet Explorer\iexplore.exe | https://sample.com/order-system | 18.6 |
| 2018/9/25 10:24:44 | 2018/9/25 10:29:01 | 328162 | ORDER DETAILS | C:\Program Files\Internet Explorer\iexplore.exe | https://sample.com/order-system/detail | 100.0 |
| 2018/9/25 10:24:44 | 2018/9/25 10:29:01 | 659481 | SPECIAL ORDER LIST.xlsx | C:\Program Files\Microsoft Office\Office14\EXCEL.EXE | C:\Users\yagi\moushikomi\SPECIAL ORDER LIST.xlsx | 70.4 |
| 2018/9/25 10:29:01 | 2018/9/25 10:34:52 | 263856 | ORDER LIST | C:\Program Files\Internet Explorer\iexplore.exe | https://sample.com/order-system | 100.0 |
| 2018/9/25 10:29:01 | 2018/9/25 10:34:52 | 659481 | SPECIAL ORDER LIST.xlsx | C:\Program Files\Microsoft Office\Office14\EXCEL.EXE | C:\Users\yagi\moushikomi\SPECIAL ORDER LIST.xlsx | 0.0 |

Fig. 9

| LOG TYPE | WINDOW EXPOSURE RATIO (%) | EXPOSURE RATIO LEVEL | DATA VARIABLE REPRESENTING WINDOW STATE |
|---|---|---|---|
| INACTIVE | 0 | 1 | (inactive, 1) |
| | 1~25 | 2 | (inactive, 2) |
| | 26~50 | 3 | (inactive, 3) |
| | 51~75 | 4 | (inactive, 4) |
| | 76~100 | 5 | (inactive, 5) |
| ACTIVE | – | – | active |

Fig. 10

| START TIME | END TIME | WINDOW HANDLE | WINDOW TITLE | exe NAME | URL/PATH NAME | DATA VARIABLE REPRESENTING WINDOW STATE | DATA VARIABLE REPRESENTING ELEMENT GROUP UNIT |
|---|---|---|---|---|---|---|---|
| 2018/9/25 10:15:23 | 2018/9/25 10:19:10 | 263856 | ORDER LIST | C:¥Program Files¥Internet Explorer¥iexplore.exe | https://sample.com/order-system | active | ORDER LIST |
| 2018/9/25 10:19:10 | 2018/9/25 10:22:08 | 328162 | ORDER DETAILS | C:¥Program Files¥Internet Explorer¥iexplore.exe | https://sample.com/order-system/detail | active | ORDER DETAILS |
| 2018/9/25 10:22:08 | 2018/9/25 10:24:44 | 659481 | SPECIAL ORDER LIST.xlsx | C:¥Program Files¥Microsoft Office¥Office14¥EXCEL.EXE | C:¥Users¥yagi¥moushikomi¥SPECIAL ORDER LIST.xlsx | active | SPECIAL ORDER LIST |
| 2018/9/25 10:24:44 | 2018/9/25 10:29:01 | 328162 | ORDER DETAILS | C:¥Program Files¥Internet Explorer¥iexplore.exe | https://sample.com/order-system/detail | active | ORDER DETAILS |
| 2018/9/25 10:29:01 | 2018/9/25 10:34:52 | 263856 | ORDER LIST | C:¥Program Files¥Internet Explorer¥iexplore.exe | https://sample.com/order-system | active | ORDER LIST |

Fig. 11

| START TIME | END TIME | WINDOW HANDLE | WINDOW TITLE | exe NAME | URL/PATH NAME | WINDOW EXPOSURE RATIO | DATA VARIABLE REPRESENTING WINDOW STATE | DATA VARIABLE REPRESENTING ELEMENT GROUP UNIT |
|---|---|---|---|---|---|---|---|---|
| 2018/9/25 10:15:23 | 2018/9/25 10:19:10 | 263856 | ORDER LIST | C:¥Program Files¥Internet Explorer¥iexplore.exe | https://sample.com/order-system | 100.0 | | ORDER LIST |
| 2018/9/25 10:19:10 | 2018/9/25 10:22:08 | 328162 | ORDER DETAILS | C:¥Program Files¥Internet Explorer¥iexplore.exe | https://sample.com/order-system/detail | 100.0 | (inactive, 5) | ORDER DETAILS |
| 2018/9/25 10:19:10 | 2018/9/25 10:22:08 | 263856 | ORDER LIST | C:¥Program Files¥Internet Explorer¥iexplore.exe | https://sample.com/order-system | 66.9 | (inactive, 5) | ORDER LIST |
| 2018/9/25 10:22:08 | 2018/9/25 10:24:44 | 659481 | SPECIAL ORDER LIST.xlsx | C:¥Program Files¥Microsoft Office¥Office14¥EXCEL.EXE | C:¥Users¥yagi¥moushikomi¥SPECIAL ORDER LIST.xlsx | 100.0 | (inactive, 4) | SPECIAL ORDER LIST |
| 2018/9/25 10:22:08 | 2018/9/25 10:24:44 | 328162 | ORDER DETAILS | C:¥Program Files¥Internet Explorer¥iexplore.exe | https://sample.com/order-system/detail | 76.1 | (inactive, 5) | ORDER DETAILS |
| 2018/9/25 10:22:08 | 2018/9/25 10:29:01 | 263856 | ORDER LIST | C:¥Program Files¥Internet Explorer¥iexplore.exe | https://sample.com/order-system | 18.6 | (inactive, 5) | ORDER LIST |
| 2018/9/25 10:22:08 | 2018/9/25 10:29:01 | 328162 | ORDER DETAILS | C:¥Program Files¥Internet Explorer¥iexplore.exe | https://sample.com/order-system/detail | 100.0 | (inactive, 2) | ORDER DETAILS |
| 2018/9/25 10:24:44 | 2018/9/25 10:29:01 | 659481 | SPECIAL ORDER LIST.xlsx | C:¥Program Files¥Microsoft Office¥Office14¥EXCEL.EXE | C:¥Users¥yagi¥moushikomi¥SPECIAL ORDER LIST.xlsx | 70.4 | (inactive, 5) | SPECIAL ORDER LIST |
| 2018/9/25 10:24:44 | 2018/9/25 10:34:52 | 263856 | ORDER LIST | C:¥Program Files¥Internet Explorer¥iexplore.exe | https://sample.com/order-system | 100.0 | (inactive, 4) | ORDER LIST |
| 2018/9/25 10:29:01 | 2018/9/25 10:34:52 | 659481 | SPECIAL ORDER LIST.xlsx | C:¥Program Files¥Microsoft Office¥Office14¥EXCEL.EXE | C:¥Users¥yagi¥moushikomi¥SPECIAL ORDER LIST.xlsx | 0.0 | (inactive, 5) | SPECIAL ORDER LIST |
| | | | | | | | (inactive, 1) | |

Fig. 15

| ATTRIBUTE VALUE OF OBJECT | VISUAL VARIABLE | DATA VARIABLE | NUMBER OF GROUPS OF VISUAL VARIABLE |
|---|---|---|---|
| Y-AXIS DIRECTION WIDTH | SIZE | WINDOW STATE | 5 |
| PAINT COLOR/ BORDER COLOR | HUE | WINDOW TITLE | 3 |
| OPACITY LEVEL | OPACITY | WINDOW STATE | 3 |
| TYPE OF BORDER | TEXTURE | – | – |

SIZE 114a-1

| GROUP | WINDOW STATE | SET VALUE |
|---|---|---|
| 1 | active, (inactive, 1) | 20 |
| 2 | (inactive, 2) | 15 |
| 3 | (inactive, 3) | 10 |
| 4 | (inactive, 4) | 5 |
| 5 | (inactive, 5) | 0 |

Fig. 18

HUE  $_{114b-1}$

| GROUP | WINDOW TITLE | SET VALUE |
|---|---|---|
| 1 | ORDER DETAILS | RED |
| 2 | SPECIAL ORDER LIST.xlsx | GREEN |
| 3 | ORDER LIST | BLUE |

Fig. 19

OPACITY                     114c-1

| GROUP | WINDOW STATE | SET VALUE |
|---|---|---|
| 1 | active | 1.0 |
| 2 | (inactive, 1), (inactive, 2), (inactive, 3), (inactive, 4) | 0.5 |
| 3 | (inactive, 5) | 0.0 |

Fig. 23

| ATTRIBUTE VALUE OF OBJECT | VISUAL VARIABLE | DATA VARIABLE | NUMBER OF GROUPS OF VISUAL VARIABLE |
|---|---|---|---|
| Y-AXIS DIRECTION WIDTH | SIZE | WINDOW STATE | 2 |
| PAINT COLOR/ BORDER COLOR | HUE | WINDOW TITLE | 3 |
| OPACITY LEVEL | OPACITY | WINDOW STATE | 3 |
| TYPE OF BORDER | TEXTURE | – | – |

SIZE 114a-2

| GROUP | WINDOW STATE | SET VALUE |
|---|---|---|
| 1 | active, (inactive, 1), (inactive, 2), (inactive, 3) | 20 |
| 2 | (inactive, 4), (inactive, 5) | 0 |

Fig. 26

HUE
                                              114b-2

| GROUP | WINDOW TITLE | SET VALUE |
|---|---|---|
| 1 | ORDER DETAILS | RED |
| 2 | SPECIAL ORDER LIST.xlsx | GREEN |
| 3 | ORDER LIST | BLUE |

Fig. 27

OPACITY                              114c-2

| GROUP | WINDOW STATE | SET VALUE |
|---|---|---|
| 1 | active | 1.0 |
| 2 | (inactive, 1), (inactive, 2), (inactive, 3), (inactive, 4) | 0.5 |
| 3 | (inactive, 5) | 0.0 |

Fig. 30

| ATTRIBUTE VALUE OF OBJECT | VISUAL VARIABLE | DATA VARIABLE | NUMBER OF GROUPS OF VISUAL VARIABLE |
|---|---|---|---|
| Y-AXIS DIRECTION WIDTH | SIZE | — | — |
| PAINT COLOR/ BORDER COLOR | HUE | WINDOW TITLE | 3 |
| OPACITY LEVEL | OPACITY | WINDOW STATE | 3 |
| TYPE OF BORDER | TEXTURE | WINDOW STATE | 2 |

TEXTURE 114d-3

| GROUP | WINDOW STATE | SET VALUE |
|---|---|---|
| 1 | active, (inactive, 1), (inactive, 2), (inactive, 3) | NONE |
| 2 | (inactive, 4), (inactive, 5) | DOTTED LINES |

Fig. 32

HUE 114b-3

| GROUP | WINDOW TITLE | SET VALUE |
|---|---|---|
| 1 | ORDER DETAILS | RED |
| 2 | SPECIAL ORDER LIST.xlsx | GREEN |
| 3 | ORDER LIST | BLUE |

Fig. 33

OPACITY                             114c-3

| GROUP | WINDOW STATE | SET VALUE |
|---|---|---|
| 1 | active | 1.0 |
| 2 | (inactive, 1), (inactive, 2), (inactive, 3) | 0.5 |
| 3 | (inactive, 4), (inactive, 5) | 0.0 |

Fig. 38

| APPLICATION NAME | WINDOW TITLE | |
|---|---|---|
| Internet Explorer | ORDER MANAGEMENT SYSTEM LOGIN | ORDER MANAGEMENT SYSTEM |
| Internet Explorer | ORDER DETAILS (NEW) | |
| Internet Explorer | ORDER DETAILS (MODIFIED) | |
| Internet Explorer | ORDER LIST | |
| Internet Explorer | FACILITY MANAGEMENT SYSTEM | FACILITY MANAGEMENT SYSTEM |
| Internet Explorer | goo MAPS - MAP SEARCH | |
| Internet Explorer | KANAGAWA-KEN, YOKOSUKA-SHI, HIKARINOOKA - goo MAPS | |
| Internet Explorer | SEARCH RESULT FOR "COMMUNICATION LABORATORY" - goo SEARCH | |
| | ... | |
| Excel | SPECIAL ORDER LIST_201810.xlsx | |
| Excel | CASE MANAGEMENT BOOK.xlsx | |
| | ... | |
| Outlook | INBOX | |
| Outlook | SENT ITEMS | |
| | | |
| PowerPoint | ORDER RECEPTION OPERATION MANUAL.pptx | |

DISPLAY CONTROL DEVICE, DISPLAY CONTROL METHOD, AND DISPLAY CONTROL PROGRAM

CROSS-REFERENCE TO RELATED APPLICATIONS

This application is a National Stage application under 35 U.S.C. § 371 of International Application No. PCT/JP2019/041657, having an International Filing Date of Oct. 24, 2019, which claims priority to Japanese Application Serial No. 2018-209772, filed on Nov. 7, 2018. The disclosure of the prior application is considered part of the disclosure of this application, and is incorporated in its entirety into this application.

TECHNICAL FIELD

The present invention relates to a display control device, a display control method, and a display control program.

BACKGROUND ART

Generally, in a business improvement process undertaken at a business enterprise, an approach often taken involves first ascertaining the actual work situation by performing staff interviews, estimating the volume of work through observation and time measurement, and so on, and then, once a problem area has been discovered, considering improvement plans. However, ascertaining the actual work situation through interviews and so on is not only laborious, but may also be biased due to the subjectivity of some of the workers and the procedures, leading to problems in accuracy, completeness, and so on.

In response, methods for acquiring and visualizing an operation log of a terminal so that a more wide-ranging and fine-grained understanding of the actual work situation can be acquired more efficiently have been proposed in the prior art. For example, in a method for visualizing an operation log, a window that has entered an active state is monitored, whereupon an operation log is acquired and visualized (see NPL 1 and 2). According to this method, it is possible to roughly ascertain the actual work situation, such as application usage and operation implementation over a period of time, from changes in the window of the operation subject.

A method for performing visualization in a timeline format has also been proposed in the prior art (see NPL 3). By assigning time to the x axis (or the y axis) of a timeline and elements to the y axis (or the x axis), the timeline expresses the duration and the context/co-occurrence relationships of each element. In the method described in this non-patent document, information is hierarchized according to the process, the thread, and so on so that in the case of an overview, summary information is displayed on an upper level, and by selecting a part to be viewed in detail, the elements included therein can be expanded and displayed.

CITATION LIST

Non Patent Literature

[NPL 1] Verint Systems Inc., Desktop and Process Analytics, [online], [retrieved Oct. 3, 2018], Internet <URL; https://www.verint.com/engagement/our-offerings/solutions/workforce-optimization/desktop-and-process analytics/index.html>

[NPL 2] Persol Process and Technology Co., Ltd., MiTERAS [online], [retrieved Oct. 2, 2018], Internet <URL: https://www.persol-pt.co.jp/miteras/work-visible/>

[NPL 3] NIVIA, CUDA Visual Profiler, [online], [retrieved Oct. 22, 2018], Internet <URL: https://docs.nvidia.com/cuda/profiler-users-guide index.html>

SUMMARY OF THE INVENTION

Technical Problem

During complex work in a business enterprise, the work is often performed while referencing a plurality of business systems, applications, and files. Here, the following three types of windows exist as window states on a terminal.
(1) An active window
(2) A window that is not active but is displayed on a desktop and referenced.
(3) A window that is displayed on the desktop but is behind another window and not referenced.
(1), (2), and (3) are defined respectively as an active state, a referenceable state, and a non-referenced state, and (2) and (3) are defined together as an inactive state.

When a conventional method is applied to such complex work and a business system is operated while displaying a manual or a FAQ website on the desktop, it is only possible to identify the windows of the business system that are in the active state, and the actual situation, including the windows of the manual and the FAQ website that are in the inactive state, cannot be ascertained. This is the first problem.

Further, the difficulty of designing suitable representations for data and analysis purposes may be cited as a problem that arises when visualizing an operation log in order to ascertain an actual work situation. The types of data included in an operation log may be, for example, application types such as Word, Excel, and Internet Explorer, window titles, URLs, process IDs, and so on.

Typically, during a visualization operation, it is necessary to set correspondence relationships (visual variable mapping) between these data items and visual characteristics (visual variables) such as position, size, and hue. It is also necessary to set parameters (attribute value mapping) such as size projections and hue ranges, which are required to convert each element of the data into a visual variable (an attribute value) of a visual symbol, such as a line or a plane, constituting the visualization result.

At this time, it is necessary to determine the appropriateness of a representation method designed as a result of repeatedly performing, in a trial-and-error fashion, an operation for adjusting the data items that are converted into visual variables and the attribute value parameters in accordance with the data and the analysis purpose while viewing the visualization results. In other words, impediments to representing a complex actual work situation in the visualization result include the difficulty of selecting the data items to be used to list the business systems and documents of the operation subject, and the difficulty of the mapping operation, which is due to increases in the number of required visual variables occurring when the window states described in the first problem are represented in addition to the data items.

Hence, adjustment operations corresponding to the data and the analysis purpose of the user are difficult due to the individual handling of data according to the user domain or the like and the variety and complexity of the possible models. This is a second problem.

The first and second problems will be described in detail below, citing example visualizations of operation logs in a timeline format as an example.

Work for receiving applications in a browser-based business system is envisaged as a specific example of the first problem. It is assumed that the user operates the business system on a screen thereof while performing operations such as referencing a plurality of documents (a special order list.xlsx, an order reception_operation manual.pptx, and a case management book.xlsx) and checking emails during order reception.

FIG. 37 shows an example of this type of operation log, expressed in the form of a conventional timeline reflecting active states. FIG. 37 is a view showing an example of the visualization content of an operation log according to the prior art. In the example of FIG. 37, time is assigned to positions on the x axis, window titles are assigned to positions on the y axis, and application types are assigned to hues. Further, in the example of FIG. 37, the time period during which each window is in the active state is expressed by the width of a rectangle. In the example of FIG. 37, although it is possible to ascertain the operation status of each window (an order list, order details) of the business system, it is difficult to ascertain screens displayed simultaneously while the business system is operated.

Next, work using a plurality of business systems on the same browser is envisaged as a specific example of the second problem. More specifically, a situation in which two business systems, namely an "order management system" and a "facility management system", are being used in combination on Internet Explorer will be used as an example. FIG. 38 is a view showing an example of combinations of application names and window titles, among data items included in an operation log generated when two business systems are used in combination. Further, FIGS. 39 and 40 are views showing example visualizations of operation logs including the data items of FIG. 38 in the form of a timeline.

In FIGS. 39 and 40, time is expressed in positions on the x axis, the application type is expressed by the hue, and the respective data items are expressed in positions on the y axis. When the application types are assigned to positions on the y axis, as in FIG. 39, Internet Explorer, for example, is grouped into one row, making it impossible to display two types of business systems, Web search results, and so on in a distinguishable fashion.

On the other hand, when the window titles are assigned to positions on the y axis, as in FIG. 40, the number of rows on the y axis increases, making it difficult to list and compare the required information. Further, particularly in a case where the number of rows on the y axis is large, as in FIG. 40, the element to be focused on can be ascertained more easily when the elements are listed by assigning hues in work units such as business systems, Web search results, and specific file names. However, simply assigning a data item included in the log to a hue may not result in the classification desired by the user.

A method of hierarchizing the data so that applications are placed on a first level, window titles on a second level, and process IDs on a third level, listing the first level at the time of an overview, and allowing a required location to be individually expanded to a deeper level, as in the representation method described in NPL 3, may be employed as means for solving the problem of an increase in the number of rows on the y axis. FIG. 41 is a view showing an example in which data are hierarchized and then visualized in a timeline format.

In the example of FIG. 41, when a plurality of windows with identical window titles and URLs are used in combination in a browser-based business system, Internet Explorer and Excel are respectively expanded to process IDs on a third level and window titles (file names) on a second level (see (1) and (2) in FIG. 41), whereupon elements included in the different levels are compared. However, when the data items included in the log are simply hierarchized as in FIG. 41, the lower level includes all of the sub-elements of the upper level, and therefore, during expansion to a deep level, the number of rows on the y axis may increase in a similar manner to the example shown in FIG. 40, making listing impossible.

The present invention has been designed in consideration of the circumstances described above, and an object thereof is to provide a display control device, a display control method, and a display control program with which a complex actual work situation can be visualized in a state reflecting a window state on a terminal screen.

Means for Solving the Problem

To solve the problems described above and achieve the object, a display control device according to the present invention includes a conversion unit which, upon receipt of an operation log file including operation logs that indicate the content of operations performed on windows on a terminal screen, determines data variables representing window states of the windows indicated by each of the operation logs on the basis of a window state setting for setting a window state on the terminal screen, a display control unit that sets correspondence relationships between the data variables and visual variables, generates rectangular objects corresponding to the data variables, and determines attribute values of the rectangular objects on the basis of the visual variables associated with the data variables, and a visualization unit that performs drawing on the basis of sets of the rectangular objects and the attribute values determined by the display control unit.

Effects of the Invention

According to the present invention, a complex actual work situation can be visualized in a state reflecting a window state on a terminal screen.

BRIEF DESCRIPTION OF DRAWINGS

FIG. 7 is a view showing an example data configuration of an operation log.

FIG. 8 is a view showing an example data configuration of an operation log.

FIG. 9 is a view showing an example data configuration of a window state setting file.

FIG. 10 is a view showing an example data configuration of a data table generated by a conversion unit.

FIG. 11 is a view showing an example data configuration of a data table generated by the conversion unit.

FIG. 15 is a view showing an example data configuration of an attribute value mapping rule.

FIG. 16 is a view showing an example data configuration of a visual variable setting rule.

FIG. 18 is a view showing an example data configuration of the visual variable setting rule.

FIG. 19 is a view showing an example data configuration of the visual variable setting rule.

FIG. 23 is a view showing an example data configuration of the attribute value mapping rule.

FIG. 24 is a view showing an example data configuration of the visual variable setting rule.

FIG. 26 is a view showing an example data configuration of the visual variable setting rule.

FIG. 27 is a view showing an example data configuration of the visual variable setting rule.

FIG. 30 is a view showing an example data configuration of the attribute value mapping rule.

FIG. 31 is a view showing an example data configuration of the visual variable setting rule.

FIG. 32 is a view showing an example data configuration of the visual variable setting rule.

FIG. 33 is a view showing an example data configuration of the visual variable setting rule.

FIG. 38 is a view showing an example of combinations of application names and window titles, among data items included in an operation log generated when two business systems are used in combination.

DESCRIPTION OF EMBODIMENTS

An embodiment of the present invention will be described in detail below with reference to the figures. Note that the present invention is not limited by this embodiment. Further, in the figures, identical parts have been allocated identical reference symbols.

Embodiment

First, a display control device according to this embodiment will be described. In this embodiment, an operation log showing the content of operations performed on windows on a screen of a terminal (not shown) is visualized in a timeline format in order to ascertain the combined usage status of the windows.

Here, the display control device according to this embodiment solves the first problem by visualizing the operation log in consideration of the active state, the referenceable state, and the non-referenced state of the windows. The active state indicates an active window. The referenceable state indicates a window that is displayed on the desktop and referenced but is not active. The non-referenced state indicates a window that is behind another window and not referenced. The referenceable state and the non-referenced state constitute an inactive state.

The display control device according to this embodiment distinguishes the active state from the inactive state from the type of operation log and reflects this in visual variables. The display control device according to this embodiment distinguishes the referenceable state from the non-referenced state using a window exposure ratio as an index. The window exposure ratio is the proportion of a display occupied by an exposed part of a window, excluding parts in which a plurality of windows overlap and parts protruding from the display. An element that is likely, according to the window exposure ratio, to be behind another window and is therefore considered to be in the non-referenced state is visualized using a different representation method to the referenceable state.

Here, the window exposure ratio is an index for inferring the referenceable state and the non-referenced state. Hence, in the display control device according to this embodiment, instead of implementing special features such as excluding the referenceable state and the non-referenced state from the visualization subjects, the referenceable state and the non-referenced state are handled as one of the data variables representing the window state so that a user can adjust a mapping method during a mapping operation. As a result, the display control device according to the present invention can accurately ascertain the actual work situation, including the combined usage status of windows in the referenceable state, of complex work in which a plurality of windows, such as business systems and documents, are used in combination.

Figure 1:
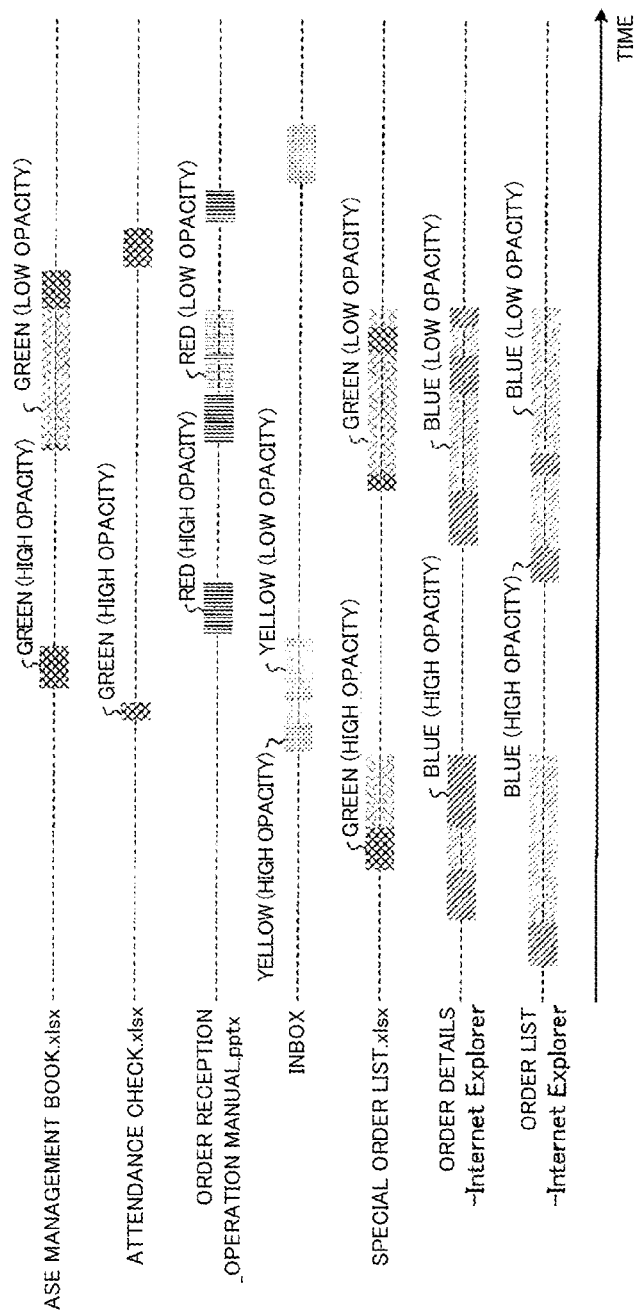
FIG. 1 is a view showing an example of visualization according to an embodiment.
Figure 37:
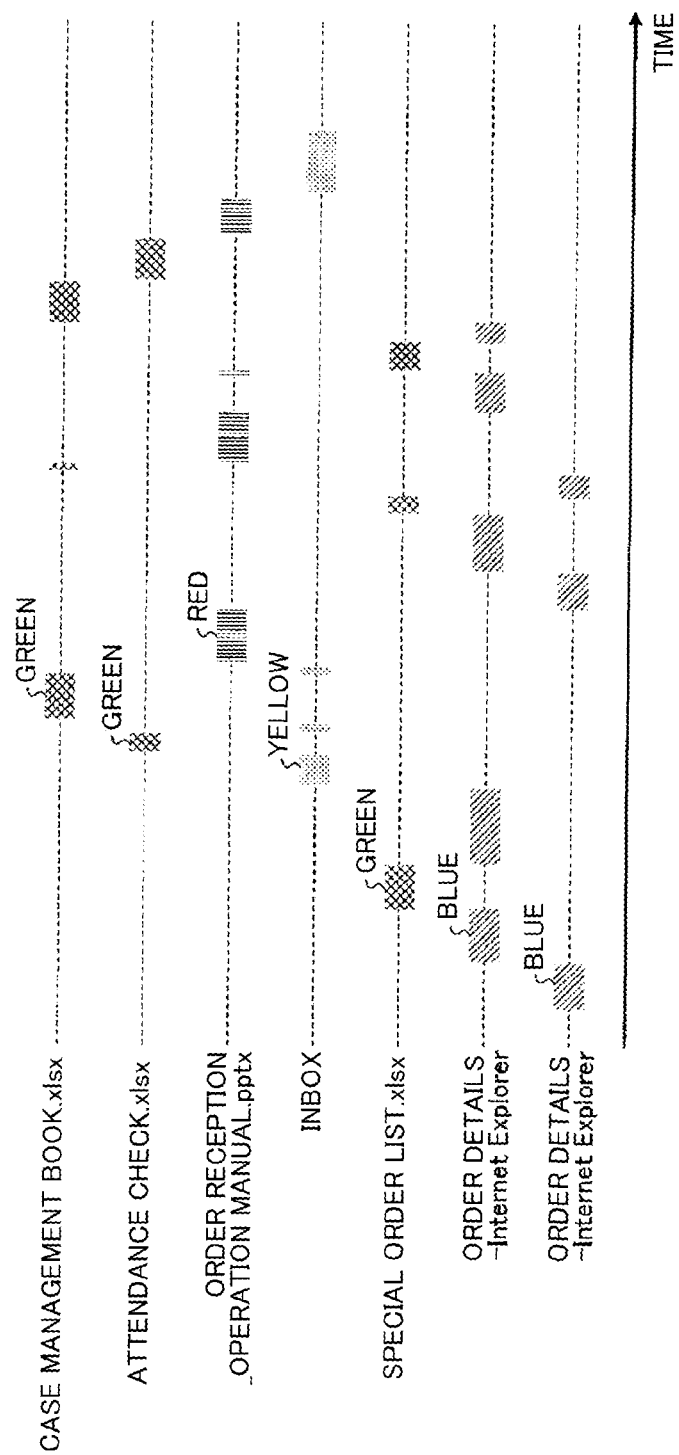
FIG. 37 is a view showing an example of the content of visualization of an operation log according to the prior art.
Figure 39:
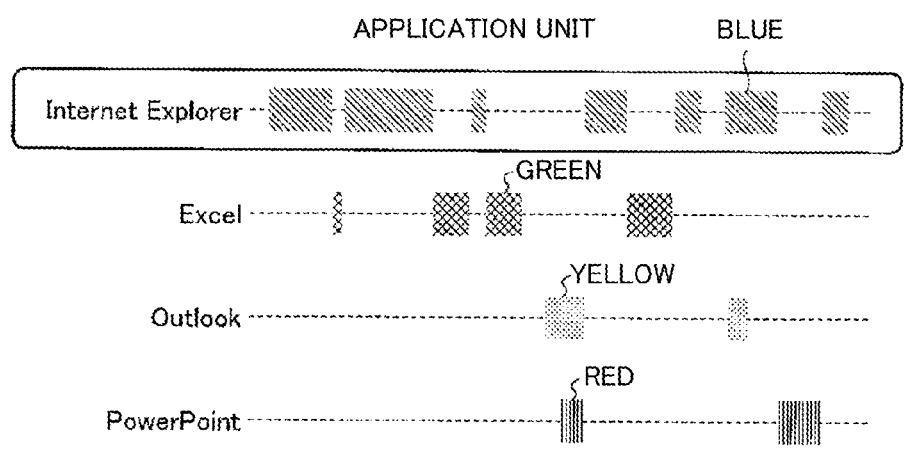
FIG. 39 is a view showing an example visualization of an operation log including the data items of FIG. 38 in a timeline format.
Figure 40:
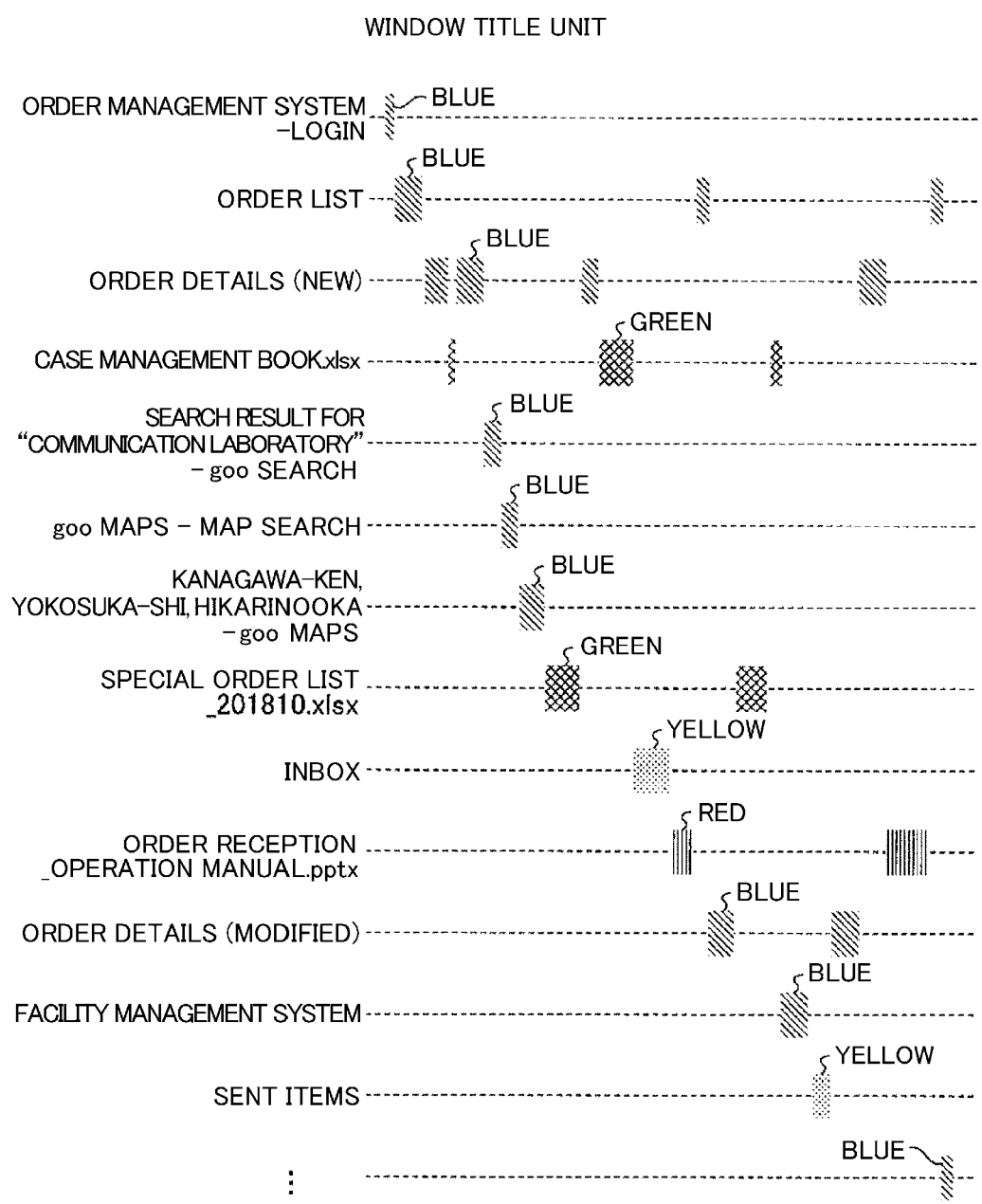
FIG. 40 is a view showing an example visualization of the operation log including the data items of FIG. 38 in a timeline format.
Figure 41:
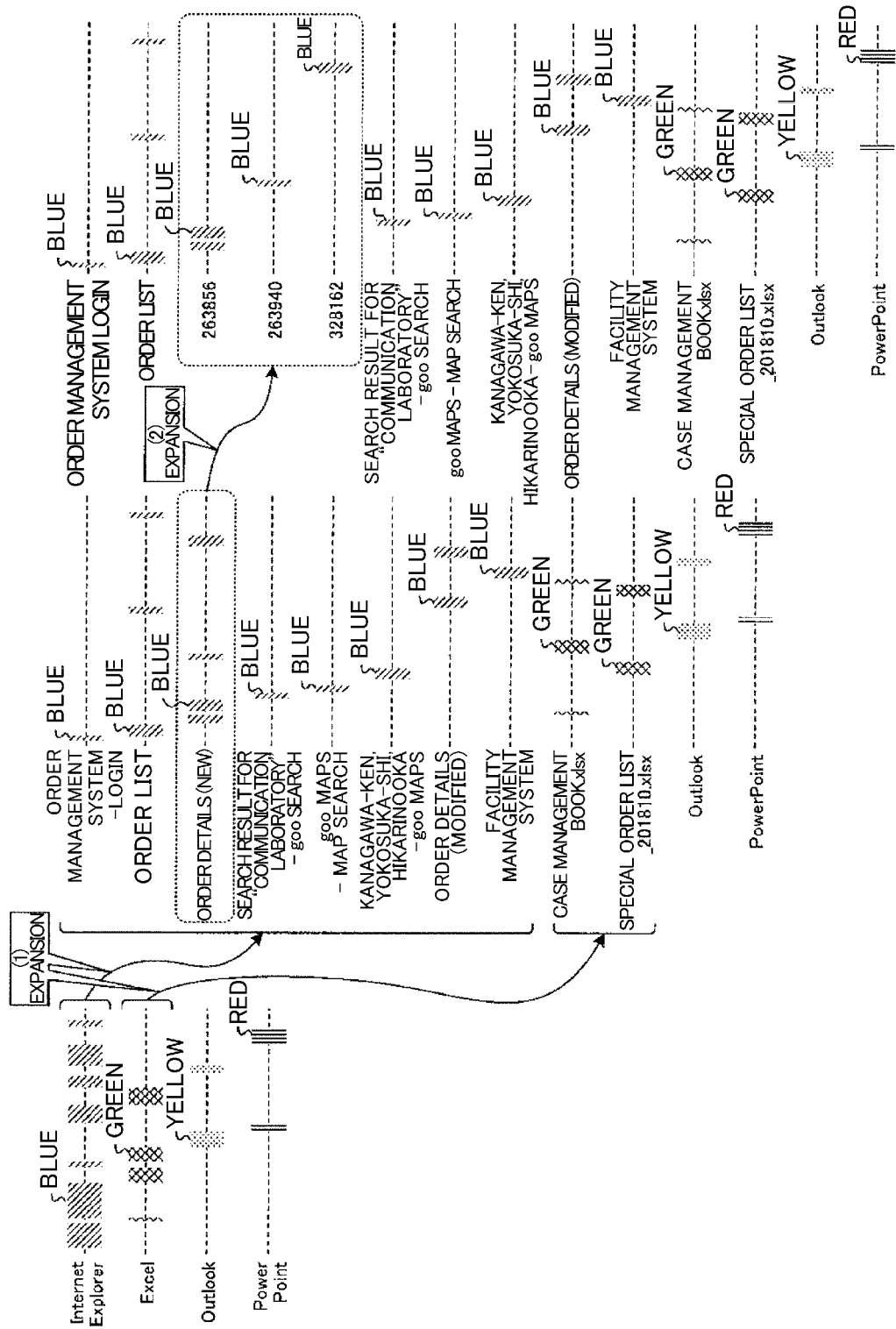
FIG. 41 is a view showing an example in which data are hierarchized and then visualized in a timeline format.

As a specific example, FIG. 1 is a view showing an example of visualization according to this embodiment. FIG. 1 shows an example visualization in a similar case to that of FIG. 37 but taking the inactive state into account. FIG. 1 shows an example in which window titles and application types are respectively assigned to positions on the y axis and colors, similarly to FIG. 37, and in addition, the window state is expressed using the opacity of rectangular objects. Rectangular objects with a high opacity indicate the active state, and rectangular objects with a low opacity indicate the inactive state.

As shown in FIG. 1, in this embodiment, by taking inactive information into account, the time from opening to closing a window (an order list, order details) of the business system and the documents that are used in combination during that time period (for example, a special order list.xlsx, an order reception_operation manual.pptx, and a case management book.xlsx) can be ascertained easily.

Further, the display control device according to this embodiment solves the second problem by allowing the user to adjust visual variable mapping and attribute value mapping by grouping subject elements and grouping attribute values. In the display control device according to this embodiment, when grouping subject elements, data are hierarchized into applications, systems or categories, and windows in accordance with the aims of the user, and in so doing, elements can be defined at the granularity that the user wishes to distinguish in the visualization result.

For this purpose, in the display control device according to this embodiment, data can be listed at different granularities by setting visual variables using the lowermost level to which each element belongs as a grouping unit. In other words, in the display control device according to this embodiment, necessary information can be displayed in detail (for example, distinguished up to the window title), and unnecessary information can be displayed in a summarized form.

Further, the display control device according to this embodiment is configured such that during attribute value grouping, visual variables to be converted into attribute values of objects are grouped freely by changing the number of groups of the visual variables, thereby allowing the user to adjust parameters easily while checking the visualization result. Here, the number of groups refers to a number of divisions of consecutive values or a number of categories. Further, the parameters are rectangle size projections (y-axis direction widths), hue ranges, opacity levels, and so on.

A functional configuration and a display control method of the display control device according to this embodiment will be described below. Hereafter, variable names included in an operation log file will be defined as "data items", and data tables generated by a conversion unit, or in other words variable names included on a data table on which a variable representing the window state and a variable representing the grouping unit have been added to the data items, will be defined as "data variables".

Figure 2:
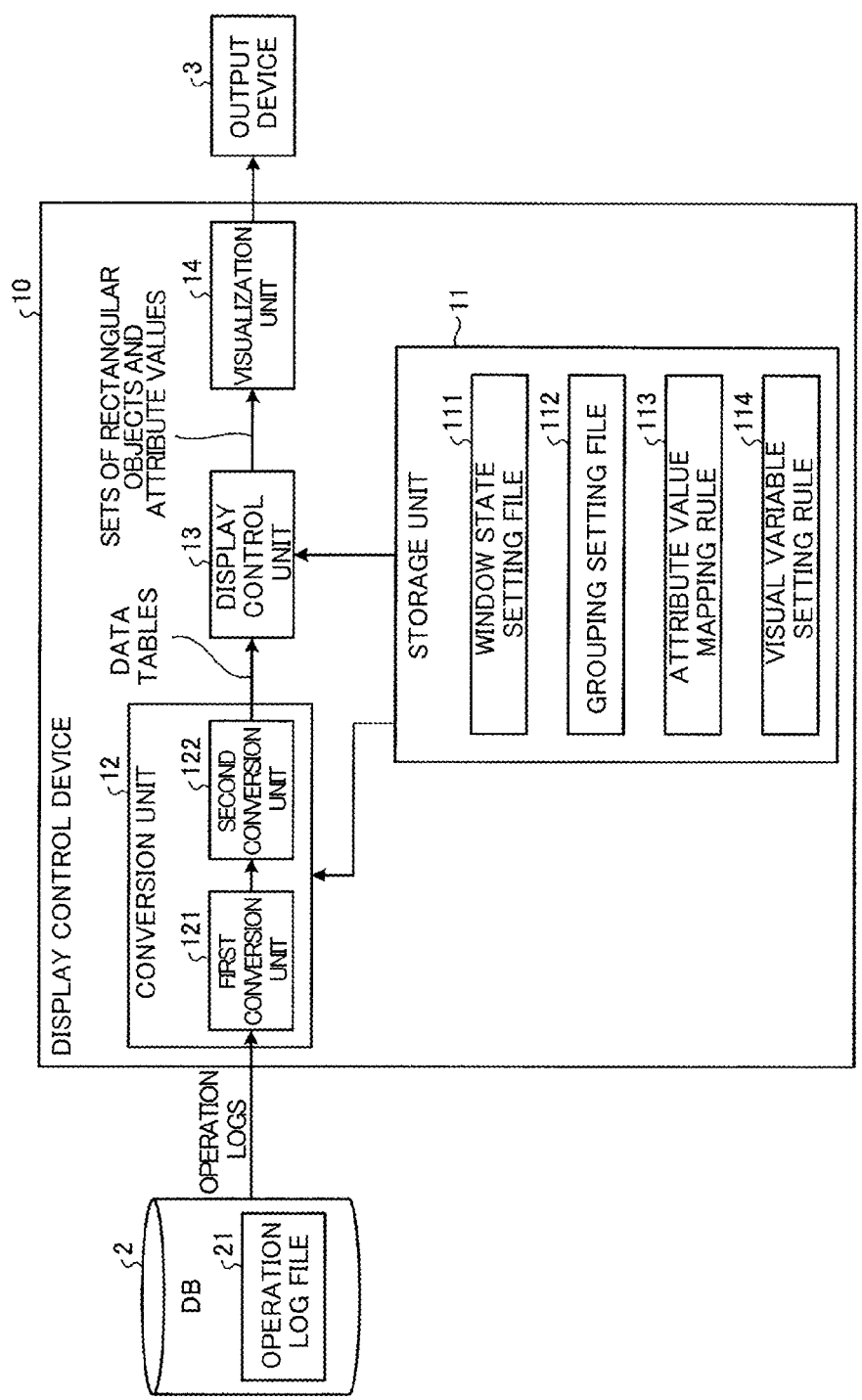
FIG. 2 is a view showing an example functional configuration of a display control device according to this embodiment.

FIG. 2 is a view showing an example functional configuration of the display control device according to this embodiment. As shown in FIG. 2, a display control device 10 according to this embodiment is connected to a database (DB) 2 and an output device 3.

The DB 2 stores an operation log file 21. The operation log file is a file including operation logs indicating the content of operations performed on windows on a screen of a terminal (not shown). The operation logs include an active log and an inactive log.

The output device 3 is a display device realized by a monitor or the like, for example. The output device 3 displays an image on a screen in accordance with display control by the display control device 10. The output device 3 may also be a printing device such as a printer.

The display control device 10 includes a storage unit 11, a conversion unit 12, a display control unit 13, and a visualization unit 14. Note that the display control device 10 is realized by, for example, reading a predetermined program to a computer or the like having a ROM (Read Only Memory), a RAM (Random Access Memory), a CPU (Central Processing Unit), and so on, and having the CPU execute the program.

The storage unit 11 stores data relating to display control. The storage unit 11 includes a window state setting file 111, a grouping setting file 112, an attribute value mapping rule 113, and a visual variable setting rule 114.

The window state setting file 111 is data used when setting the window state on the terminal screen. In the window state setting file 111, the correspondence between the window exposure ratio and an exposure ratio level can be modified.

The grouping setting file 112 is data used when setting the grouping of window elements on the terminal screen. The number of groups, the group unit, and the elements assigned to the respective groups are set in the grouping setting file 112. In the grouping setting file 112, the number of groups, the group unit, and the elements assigned to the respective groups can be modified.

The attribute value mapping rule 113 is a setting rule for setting correspondence relationships between data variables and visual variables. In the correspondence relationships between the data variables and the visual variables in the attribute value mapping rule 113, the data variables, the numbers of groups, and the set values assigned to the respective visual variables can be modified.

The visual variable setting rule 114 is a setting rule for setting the data variables, the number of groups, and the set values assigned to the visual variables. The visual variables include, for example, the size, the hue, and the opacity of a rectangular object. The visual variables may also include texture, brightness, saturation, and so on. The visual variables are not limited thereto, and other variables may be used. In the visual variable setting rule 114, the data variables, the number of groups, and the set values assigned to the visual variables can be modified. As described above, the data variables include the data items in the operation log, a variable indicating the window state, and a variable indicating the group unit of the elements.

The conversion unit 12, upon receipt of the operation log file, generates and outputs a data table on which a data variable indicating the window state and a data variable indicating the group unit of the elements have been added to each record. The conversion unit 12 includes a first conversion unit 121 and a second conversion unit 122.

The first conversion unit 121, upon receipt of the operation log file, determines the data variables indicating the window states of the windows indicated by each operation log on the basis of the window state setting file 111. When a window indicated by the operation log is in the inactive state, the first conversion unit 121 discretizes the window exposure ratio into a specific number of divisions, sets each discrete value as an exposure ratio level, and determines a group including the inactive state and the exposure ratio level as the data variable indicating the window state.

The second conversion unit 122 groups together elements of the windows indicated by each operation log into group units on the basis of the grouping setting file 112, and determines data variables indicating the group units. The conversion unit 12 outputs a data table on which a data variable indicating the window state and a data variable indicating the group unit of the elements have been added to each record.

The display control unit 13 sets (maps) correspondence relationships between the data variables on the data table generated by the conversion unit 12 and the visual variables on the basis of the attribute value mapping rule 113. The display control unit 13 generates a rectangular object corresponding to each of the records included on the data table. At this time, on the basis of the visual variable setting rule 114, the display control unit 13 determines attribute values of the rectangular objects on the basis of the visual variables associated with the data variables. The display control unit 13 outputs sets of rectangular objects and attribute values.

The visualization unit 14 performs drawing on the basis of the sets of rectangular objects and attribute values generated by the display control unit 13. The visualization unit 14 calculates coordinate values at which to arrange the respective rectangular objects on the basis of the received sets of rectangular objects and attribute values, and displays a visualization result on the output device 3. The visualization unit 14 is a drawing application used for visualization, for example. The visualization unit 14 also outputs drawing commands corresponding to parameters such as scrolling and enlargement/reduction to the output device 3.

[Processing of Display Control Device]

Figure 3:
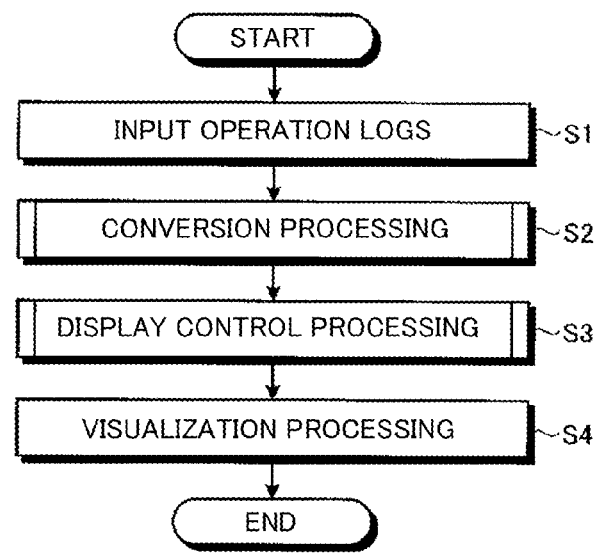
FIG. 3 is a flowchart showing processing procedures of display control processing according to this embodiment.

Next, display control processing executed by the display control device 10 will be described. FIG. 3 is a flowchart showing processing procedures of the display control processing according to this embodiment.

As shown in FIG. 3, when the display control device 10 receives the operation log file (step S1), the conversion unit 12 performs conversion processing for determining data variables for each operation log (step S2). Next, the display control unit 13 performs display control processing (step S3) to determine the attribute values of the rectangular objects on the basis of the visual variables associated with the data variables. Next, the visualization unit 14 performs visualization processing (step S4), in which drawing is performed on the basis of the sets of rectangular objects and attribute values generated by the display control unit 13, whereupon the processing is terminated.

[Processing Procedures of Conversion Processing]

Figure 4:
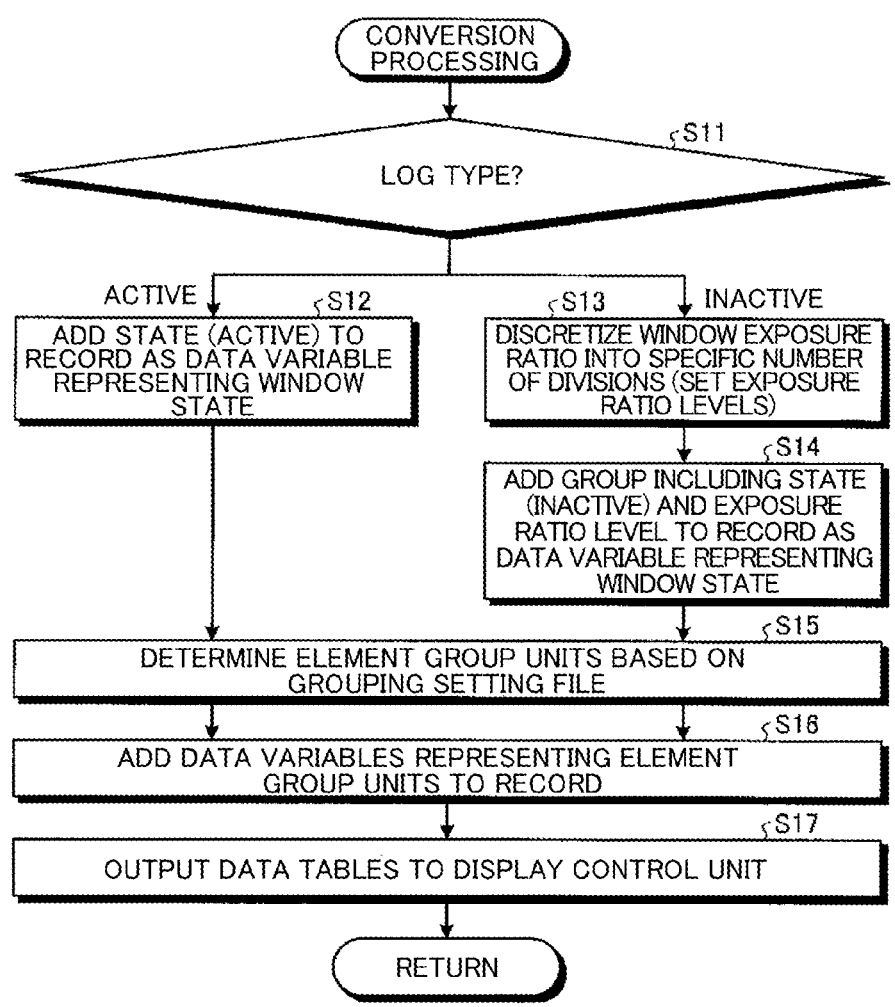
FIG. 4 is a flowchart showing processing procedures of conversion processing shown in FIG. 3.

Next, processing procedures of the conversion processing (step S2) will be described. FIG. 4 is a flowchart showing the processing procedures of the conversion processing shown in FIG. 3.

As shown in FIG. 4, in the conversion unit 12, the first conversion unit 121 determines the log type from the operation log file input therein (step S11). Having determined that the log type is active (step S11: active), the first conversion unit 121 adds the state (active) to the record as the data variable indicating the window state (step S12).

Having determined that the log type is inactive (step S11: inactive), on the other hand, the first conversion unit 121 discretizes the window exposure ratio into a specific number of divisions (step S13) and sets each discrete value as an exposure ratio level. The file generated by this processing corresponds to the window state setting file. In an initial state, the file is generated by dividing the exposure ratio equally on the basis of the number of divisions. When the user modifies the window state setting file, the assignment of exposure ratios to exposure ratio levels can be adjusted. Next, the first conversion unit 121 determines a group including the state (inactive) and the exposure ratio level as the data variable indicating the window state and adds the data variable to the record (step S14).

When step S12 or step S14 is complete, the second conversion unit 122 determines the data variable indicating the group unit of the elements for each log type on the basis of the grouping setting file 112 (step S15). The second conversion unit 122 then adds the data variable indicating the group unit of the elements to each record (step S16). The conversion unit 12 outputs the data table including the data variables added in steps S14 and S16 to the display control unit 13 (step S17).

[Processing Procedures of Display Control Processing]

Figure 5:
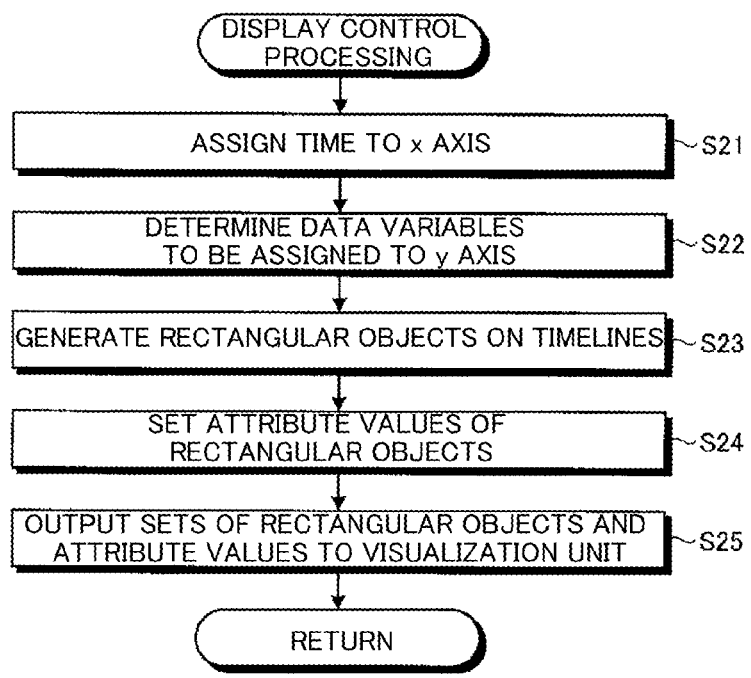
FIG. 5 is a flowchart showing processing procedures of the display control processing shown in FIG. 3.

Next, processing procedures of the display control processing (step S3) will be described. FIG. 5 is a flowchart showing the processing procedures of the display control processing shown in FIG. 3.

As shown in FIG. 5, first, the display control unit 13 performs processing to determine the data variables to assigned to the respective axes. In the case of a timeline, the display control unit 13 assigns time to the x axis (step S21). Next, the display control unit 13 determines the data variables to be assigned to the y axis in accordance with the desired visualization result (step S22).

Next, the display control unit 13 generates the rectangular objects of the timeline and sets the attribute values thereof on the basis of the attribute value mapping rule. Here, the attribute values denote the x-axis and y-axis direction widths (sizes), the paint color (hue), the opacity level, the border shape, and so on of the rectangular objects. First, the display control unit 13 generates a rectangular object corresponding to each record included on the data table (step S23). Then, in accordance with the visual variable setting rule 114, the display control unit 13 determines the attribute values of the rectangular object on the basis of the visual variables associated with the data variables (step S24). The display control unit 13 outputs sets of the rectangular objects and the attribute values to the visualization unit 14 (step S25), whereupon the processing is terminated.

Example 1

Figure 6:
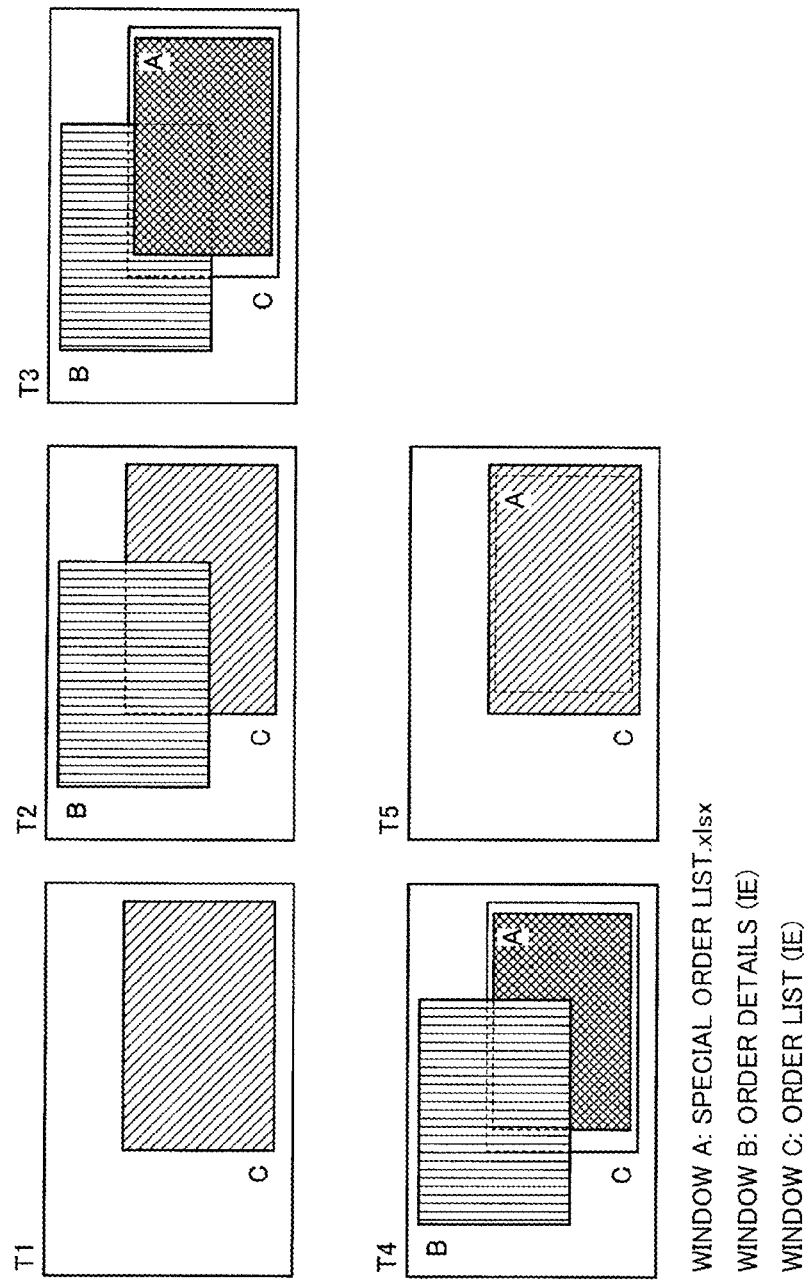
FIG. 6 is a view showing examples of window states on a terminal screen.

Next, example 1 will be described. FIG. 6 is a view showing examples of window states on a terminal screen. In this example, a case in which the window state on the screen transitions over time will be described using FIG. 6. Times T1 to T5 in FIG. 6 denote times at which the active window changes, and windows A, B, and C respectively denote a "special order list.xlsx" window, an "order details" window, and an "order list" window. Further, in the periods T1 to T5, the window depicted with solid lines is furthest toward the front, and the shaded windows are in the referenceable state.

More specifically, in the periods T2 and T3, the window C is hidden behind the windows A and B and is therefore in the non-referenced state. Similarly, in the period T5, the window A is hidden behind the window C and is therefore in the non-referenced state.

FIGS. 7 and 8 are views showing example data configurations of operation logs. Operation logs D1 and D2 in FIGS. 7 and 8 are operation logs relating to the windows on the terminal screen in FIG. 6. "T1" to "T5", shown on the right end of each record on the operation logs D1 and D2, correspond to the periods T1 to T5 in FIG. 6. The operation log D1 is a log (an active log) on which information relating to windows activated by the user is recorded, and the operation log D2 is a log (an inactive log) on which information relating to the windows displayed on the desktop by the user is recorded.

The operation log D1 (the active log) includes items indicating the display start time, the display end time, the window handle, the window title, the EXE name of the subject application, and the URL or path name. Further, the operation log D2 (the inactive log) includes an item indicating the window exposure ratio as well as similar items to the operation log D1. In FIG. 7, the windows in the non-referenced state, i.e. the window C (the order list) in the periods T2 and T3 and the window A (the special order list.xlsx) in the period T4, have a low window exposure ratio value of less than 20% on the operation log D2.

Note that the operation logs D1 and D2 shown in FIGS. 7 and 8 are formatted such that a log file exists for each log type, but the operation log file is not limited to this format. For example, the operation log file may be formatted such that records corresponding to a plurality of log types are described in a single log file. In the case of this format, the operation log file includes a status expressing the log type (active or displayed) in addition to the display start time and end time, the window handle, the window title, the EXE name, the URL or path name, and the window exposure ratio. Further, when the operation logs of a plurality of users are used as input, items indicating a user name and a terminal name, for example, may be added to the data items on the operation logs D1 and D2 in order to distinguish between the plurality of users and a plurality of terminals.

Specific examples of attribute value grouping and timeline format representation methods in a case where the operation logs D1 and D2 of FIGS. 7 and 8 are used as input will be described below.

First, the conversion unit 12 of the display control device 10 sets the data variables indicating the respective window states using the active log (the operation log D1) and the inactive log (the operation log D2). Accordingly, the processing performed by the first conversion unit 121 up to setting of the data variables indicating the window states will now be described. FIG. 9 is a view showing an example data configuration of the window state setting file 111. In a window state setting file 111a shown in FIG. 9, the log type, the window exposure ratio, the exposure ratio level, and the data variable indicating the window state are associated with each other.

As shown in FIG. 9, when the log type is inactive, the first conversion unit 121 determines the data variable indicating the window state by discretizing the window exposure ratio into five stages and setting an exposure ratio level for each range. The data variable indicating the window state is then added to each record.

FIGS. 10 and 11 are views showing example data configurations of the data tables generated by the conversion unit 12. As shown on a column L11 of a data table D1' in FIG. 10, with respect to the active log (the operation log D1), the conversion unit 12 adds the data variable "active" indicating the window state to each record of the operation log D1.

Further, with respect to the inactive log (the operation log D2), the first conversion unit 121 sets an exposure ratio level corresponding to the window exposure ratio on the basis of the window state setting file 111, and determines a group including the inactive state and the exposure ratio level as the data variable indicating the window state. For example, the window exposure ratio of the record on the first row of the operation log D2 is 100%, and therefore the first conversion unit 121 sets the exposure ratio level at 5, sets "(inactive, 5)" as a group including the inactive state and the exposure ratio level, and adds "(inactive, 5)" as the data variable indicating the window state (see the column L13 in FIG. 11). Thus, the first conversion unit 121 generates data tables D1', D2' on which the data variable indicating the window state has been added to each record of the operation logs D1 and D2.

Figure 12:
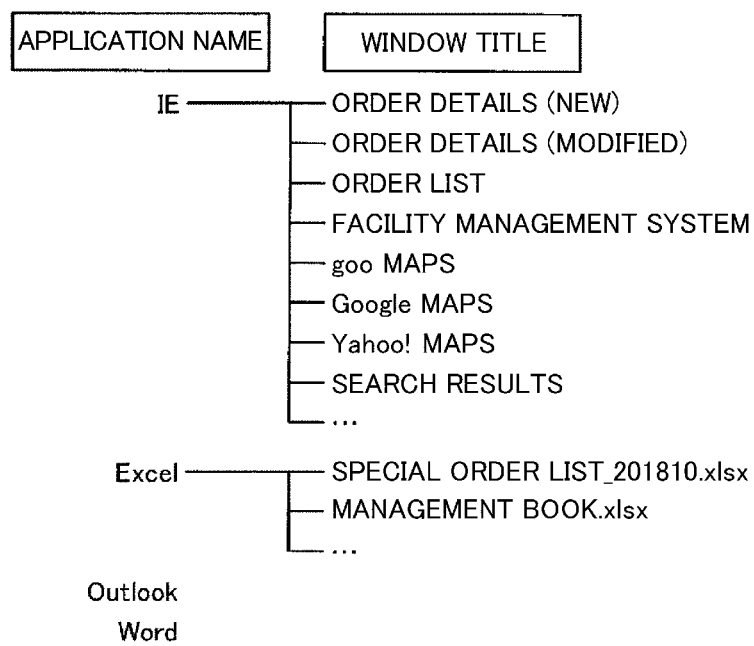
FIG. 12 is a view illustrating operation log hierarchization based on data items.
Figure 13:
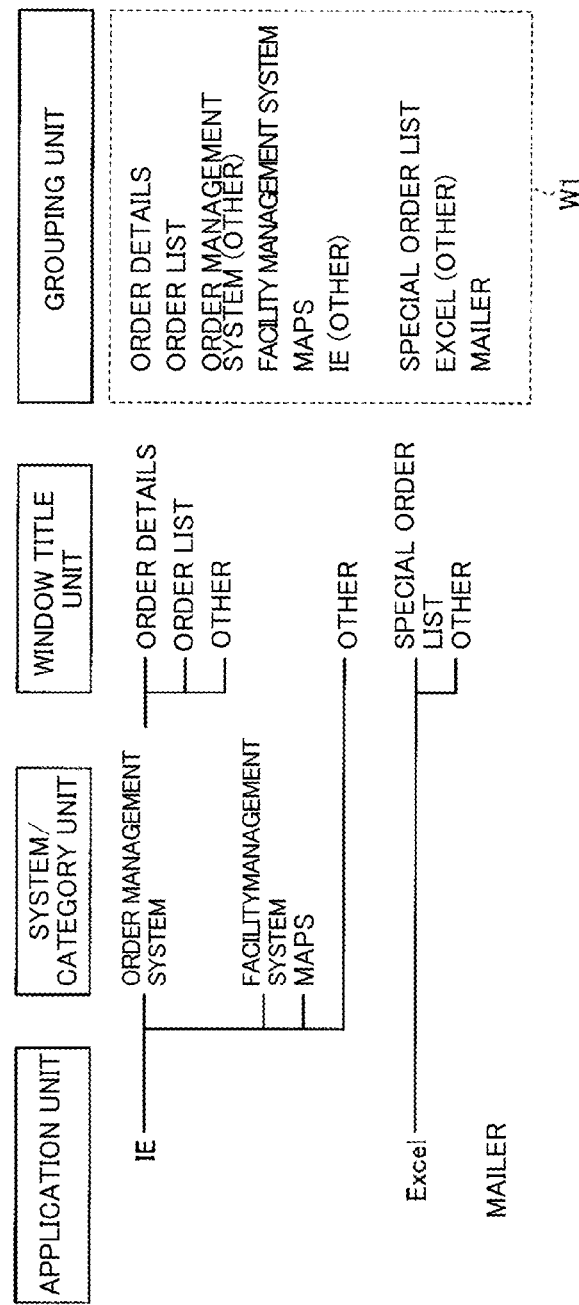
FIG. 13 is a view illustrating operation log hierarchization based on an element grouping setting.

Next, processing executed by the second conversion unit 122 up to determining the data variable indicating the group unit of the elements will be described using FIGS. 12 to 14. Here, it is assumed that window titles corresponding to application names are included in the operation log as a data item. FIG. 12 is a view illustrating operation log hierarchization based on the data items. FIG. 13 is a view illustrating operation log hierarchization based on the element grouping setting.

When the operation log is hierarchized by setting the application name on a first level and setting the window title on a second level, the state shown in FIG. 12 is acquired. Here, as described above, the second problem arises in that when one of the levels is converted into a visual variable, business systems cannot be distinguished in application units, and in that in window title units, the number of elements is large, making it impossible to list all of the elements.

In response to this problem, FIG. 13 shows an example of element grouping corresponding to the aims of the user according to this embodiment. As shown in FIG. 13, hierarchization is performed so that the application unit is set as the first level, a user-specified category unit such as a system or a map is set as the second level, and the window title unit is set as the third level, and the granularity (the level) to be distinguished is specified for the elements on the operation log. The display control device 10 then employs the lowermost level (see the frame W1 in FIG. 13) to which each element belongs as the grouping unit.

Figure 14:
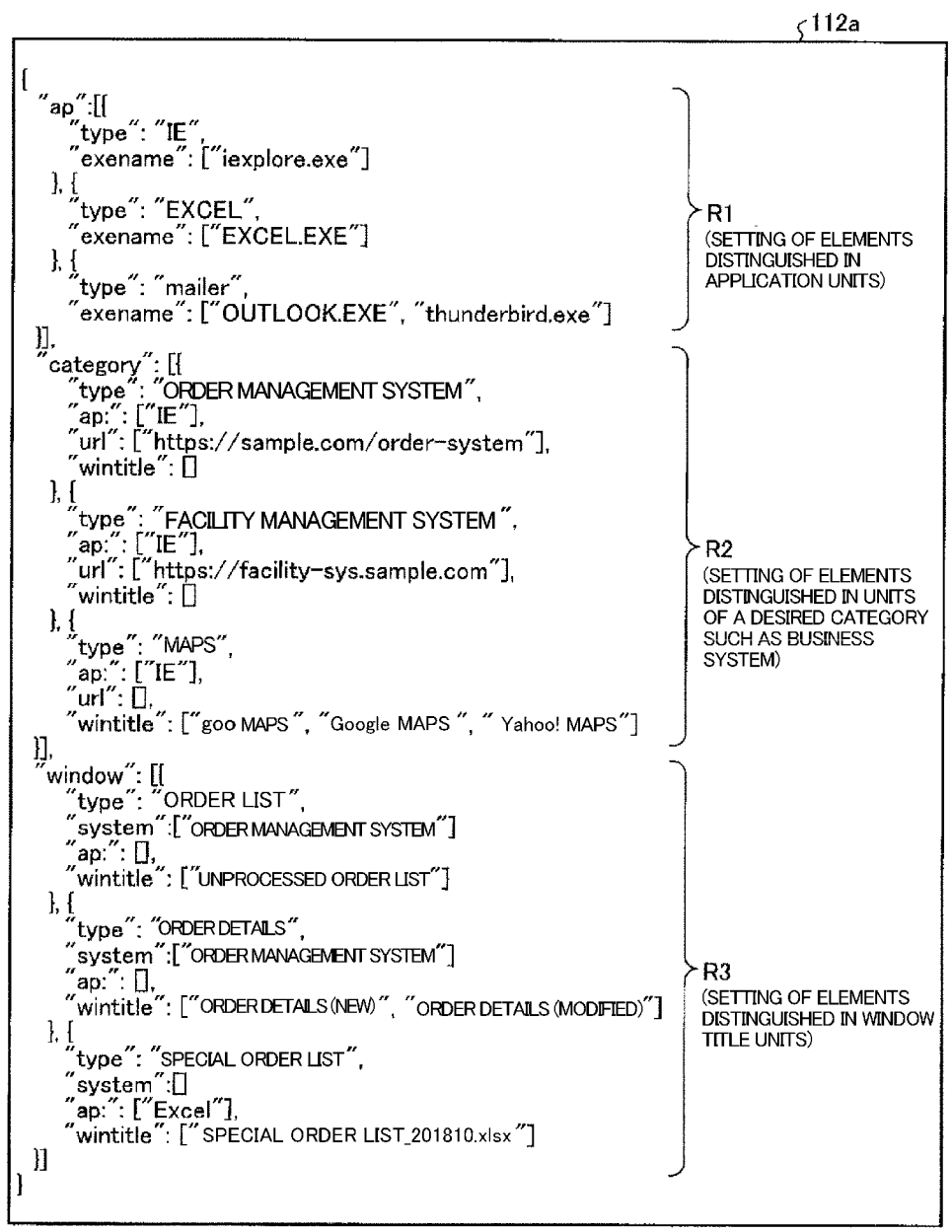
FIG. 14 is a view showing an example description of a grouping setting in a grouping setting file.

FIG. 14 is a view showing an example description of the grouping setting in the grouping setting file 112. As shown by an example description 112a in FIG. 14, in the grouping setting file 112, a plurality of elements to be distinguished in application units can be described in "ap" (see a region R1 in FIG. 14), a plurality of elements to be distinguished in units of a desired category such as business systems can be described in "category" (see a region R2 in FIG. 14), and a plurality of elements to be distinguished in window title units can be described in "window" (see a region R3 in FIG. 14). Note that the example description 112a in FIG. 14 is a character string, but the grouping setting file 112 may be described using regular expression.

In the example description 112a, when character strings specified in "exename", "url", and "wintitle" are respectively included in data items "exename", "url", and "wintitle" on the log, the "type" of each element is set as the group unit.

For example, a case in which two types of business systems, namely an order management system and a facility management system, are used on Internet Explorer, and while using the systems, a map search is performed and a website is viewed will be described.

In this case, in the example description 112a, "order list" and "order details", which are specified in "window", are distinguished up to the window title unit (see the region R3 in FIG. 14). Further, in the example description 112a, the other windows on the order management system are grouped as "order management system (other)", which is specified in "category", in a different form to the two aforementioned window titles (see the region R2 in FIG. 14). Similarly, in the example description 112a, maps are grouped in a form in which maps corresponding to a plurality of online map search services described in "wintitle" are summarized as "maps" (see the region R2 in FIG. 14). Furthermore, in the example description 112a, views of other websites on Internet Explorer are grouped as "IE (other)".

The second conversion unit 122 groups the window elements indicated by the respective records of the operation log in grouping units in accordance with the grouping setting file 112 having the description content shown in the example on FIG. 14. The second conversion unit 122 then determines the data variables indicating the group units.

More specifically, in the record on the first row of the operation log D1 in FIG. 7, the window title is "order list", and therefore this corresponds to the grouping unit "order list", as shown in FIG. 10. Accordingly, the second conversion unit 122 adds "order list" to the record on the first row of the operation log D1 as the data variable indicating the window element unit (see column L12 in FIG. 10). Further, in the record on the second row of the operation log D2 in FIG. 8, the window title is "order details", and therefore this corresponds to the grouping unit "order details", as shown in FIG. 11. Accordingly, the second conversion unit 122 adds "order details" to the record on the second row of the operation log D2 as the data variable indicating the window element unit (see column L14 in FIG. 11).

Thus, the second conversion unit 122 generates the data tables D1', D2' on which the data variable indicating the element unit has been added to each of the records of the operation logs D1 and D2.

Next, the display control unit 13 of the display control device 10, having assigned time to the x axis and the window title to the y axis, generates the rectangular objects of the timelines for the active log and the inactive log. The display control unit 13 then executes processing to determine the attribute values of the rectangular objects, or in other words the parameters of the visual variables of the lines and planes constituting the rectangular objects.

FIG. 15 is a view showing an example data configuration of the attribute value mapping rule 113. As shown in FIG. 15, an attribute value mapping rule 113a includes items corresponding to the attribute value of the object, the visual variable, the data variable, and the number of groups of the visual variable.

For example, in the attribute value mapping rule 113a, "size", "window state", and "5" are associated with the y-axis direction width as the visual variable, the data variable, and the number of groups of the visual variable, respectively. This shows that the y-axis direction width corresponds to the window state, the y-direction size is graded into 5 groups, and a window state is set in each of the size groups.

Further, in the attribute value mapping rule 113a, "hue", "window title", and "3" are associated with the paint color and border color of the rectangular object as the visual variable, the data variable, and the number of groups of the visual variable, respectively. This shows that the paint color and border color of the rectangular object correspond to the window title, the hue is graded into 3 groups, and a window title is associated with each of the hue groups.

Figure 17:
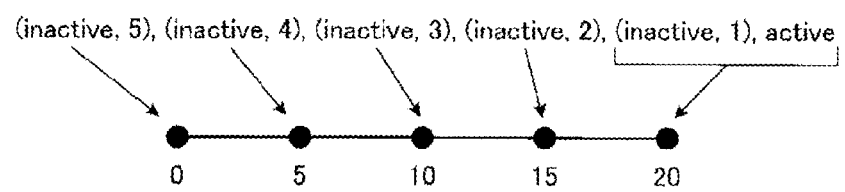
FIG. 17 is a view illustrating correspondences between respective window states and size parameters.
Figure 20:
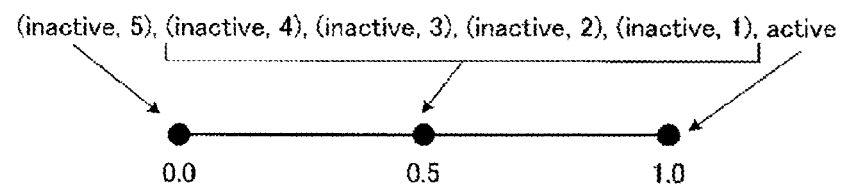
FIG. 20 is a view illustrating correspondences between respective window states and opacity parameters.

FIGS. 16, 18, and 19 are views showing example data configurations of the visual variable setting rule 114. A visual variable setting rule 114a-1 of FIG. 16 is a rule relating to size. FIG. 17 is a view illustrating correspondences between respective window states and size parameters. A visual variable setting rule 114b-1 of FIG. 18 is a rule relating to hue. A visual variable setting rule 114c-1 of FIG. 19 is a rule relating to opacity. FIG. 20 is a view illustrating correspondences between respective window states and opacity parameters. The visual variable setting rules 114a-1, 114b-1, and 114c-1 shown in FIGS. 16, 18, and 19 each include items corresponding to the group, the window state, and a set value.

First, the display control unit 13 calculates the lengths of the rectangular objects arranged in the x-axis direction on the basis of the start times and end times. Next, the display control unit 13 sets the attribute values of the rectangular objects in accordance with the attribute value mapping rule 113a and the visual variable rules 114a-1, 114b-1, and 114c-1.

For example, with respect to the size (corresponding to the y-axis width) shown in the visual variable rule 114a-1, on the basis of the number of groups "5" (see the first row of the attribute value mapping rule 113), values evenly mapped between "0" and "20" (default set values of the y-axis width) are set as the set values of the respective groups.

With respect to these 5 groups, the display control unit 13 groups the window state elements at the desired granularity and reflects the result in the attribute value of the object. More specifically, as shown in FIG. 17, the display control unit 13 divides the window state elements into 5 groups, namely "active" and "(inactive, 1)", "(inactive, 2)", "(inactive, 3)", "(inactive, 4)", and "(inactive, 5)". The display control unit 13 then applies "20", "15", "10", "5", and "0" thereto in order as the size (the y-axis width).

For example, the display control unit 13 applies "20" to the window states "active" and "(inactive, 1)" as the y-axis width. On the other hand, the display control unit 13 applies "0" to the window state "(inactive, 5)" as the y-axis width. As a result, when the window state is "(inactive, 5)", the y-axis width is 0, and therefore the rectangular object is not visualized.

Further, in the case of the hue, shown in the visual variable rule 114b-1, a color palette acquired using Color-Brewer (see reference document 1 "Cynthia A. Brewer, et al. ColorBrewer 2.0 [online], [retrieved Oct. 23, 2018], Internet <URL: http://colorbrewer2.org/#type=seguential&scheme=BuGn&n=3>" or reference document 2 "Mark Harrower, Cynthia Brewer, "ColorBrewer.org: An Online Tool for Selecting Colour Schemes for Maps" The Cartographic Journal, 40(1), 27-37, 2003") or the like is prepared in advance, whereupon a color code is set in accordance with the number of groups. Alternatively, similarly to the size, the display control unit 13 may use values mapped evenly on a color map formed from consecutive hue values on the basis of the number of groups. In example 1, the former method is employed.

Specifically, in the case of the hue, shown in the visual variable rule 114b-1, on the basis of the number of groups "3" of window titles (see the second row of the attribute value mapping rule 113), the display control unit 13 sets "red", "green", and "blue" as the set values of the respective groups. More specifically, the display control unit 13 divides the window titles into 3 groups, namely "order details", "special order list.xlsx", and "order list", and applies red, green, and blue thereto in order as the attribute value.

In the case of the opacity, shown in the visual variable rule 114c-1, similarly to the size, values acquired by evenly mapping the number of groups between "0.0" and "1.0" are set as the set values. In the case of the opacity shown in the visual variable rule 114c-1, on the basis of the number of groups "3" (see the third row of the attribute value mapping rule 113), values evenly mapped between "0.0" and "1.0" are set as the set values of the respective groups.

The display control unit 13 divides the window states into 3 groups, namely "active", a group including "(inactive, 1)", "(inactive, 2)", "(inactive, 3)", and "(inactive, 4)", and "(inactive, 5)", and applies "1.0", "0.5", and "0.0" thereto in order as the attribute value (see FIG. 20). For example, the display control unit 13 applies "1.0" to the window state "active" as the opacity. On the other hand, the display control unit 13 applies "0" to the window state "(inactive, 5)" as the opacity. As a result, when the window state is "(inactive, 5)", the rectangular object becomes transparent and is therefore not visualized.

Next, the visualization unit 14 of the display control device 10 calculates the coordinate values of the respective rectangular objects using the attribute values of the rectangular objects, determined by the display control unit 13 from the set values, and draws rectangles on the timelines in order of the inactive state and the active state.

Figure 21:
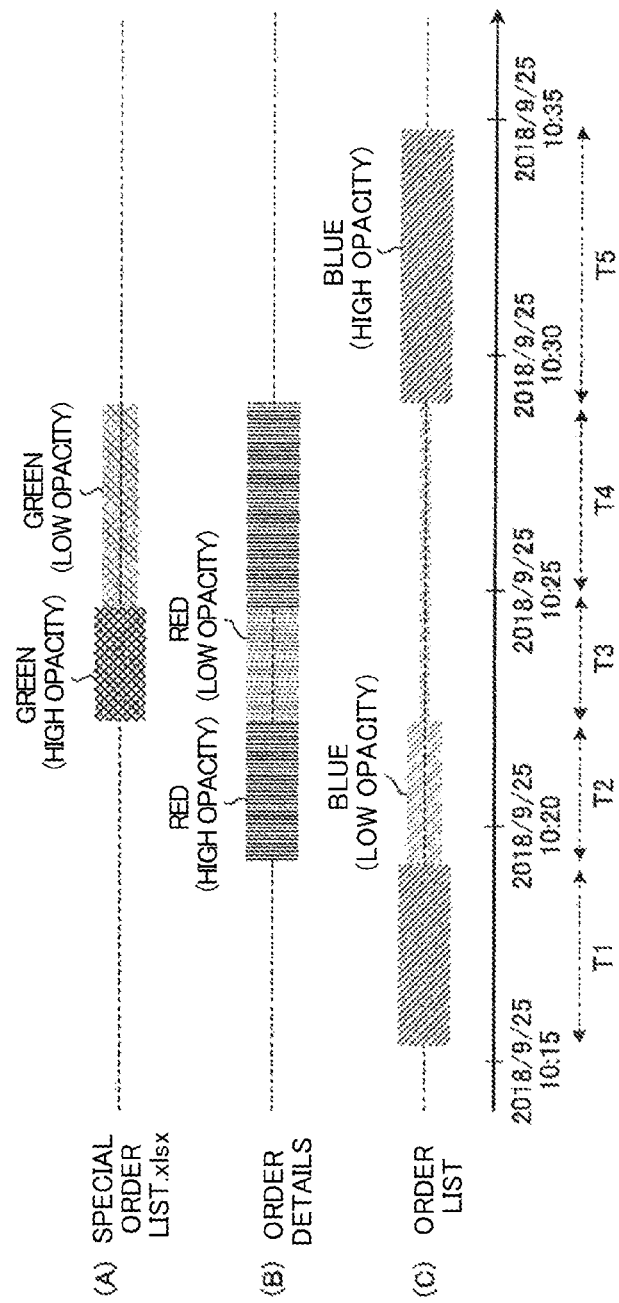
FIG. 21 is a view showing an example of a case in which the content of the operation logs in the operation log file shown in FIGS. 7 and 8 is visualized in a timeline format.

FIG. 21 is a view showing an example of a case in which the content of the operation logs in the operation log file shown in FIGS. 7 and 8 is visualized in a timeline format. FIG. 21 shows a visualization result generated on the basis of the set values of the visual variable setting rules 114a-1, 114b-1, and 114c-1 shown respectively in FIGS. 16, 18, and 19. Note that periods T1 to T5 in FIG. 21 correspond to the periods T1 to T5 shown in FIGS. 7 and 8.

As shown on the respective timelines in FIG. 21, in example 1, the level of the window state is expressed as the y-axis direction width of the rectangular object. Further, in example 1, the window element groups are distinguished by differences in the hue of the rectangular object. Furthermore, in example 1, the level of the window state is expressed by the degree of opacity of the rectangular object.

For example, a group (C) representing the order list is formed by a "blue" timeline, and a rectangular object covering the period T2 has a low opacity and a y-axis direction width of "15", indicating the level 2 inactive state. Further, the rectangular object covering the period T3 in the order list group (C) has a low opacity and a y-axis direction width of "5", indicating the level 4 inactive state. In a group (A) representing the special order list, no rectangular object is shown in the period T5, indicating the level 5 inactive state.

The user can freely modify the numbers of groups and set values of the attribute value mapping rule 113 and the visual variable setting rule 114 and the elements assigned thereto, and in so doing, the user can modify the attribute values of the rectangular objects.

Further, by assigning "0" as the size or assigning "0" as the opacity, the user can set the rectangular object to which this attribute value is applied so as not to be displayed. Hence, in this example, a rectangular object can be set so as not to be displayed simply by modifying the visual variable setting rule 114, thereby eliminating the need to add a new feature for setting a rectangular object so as not to be displayed.

Figure 22:
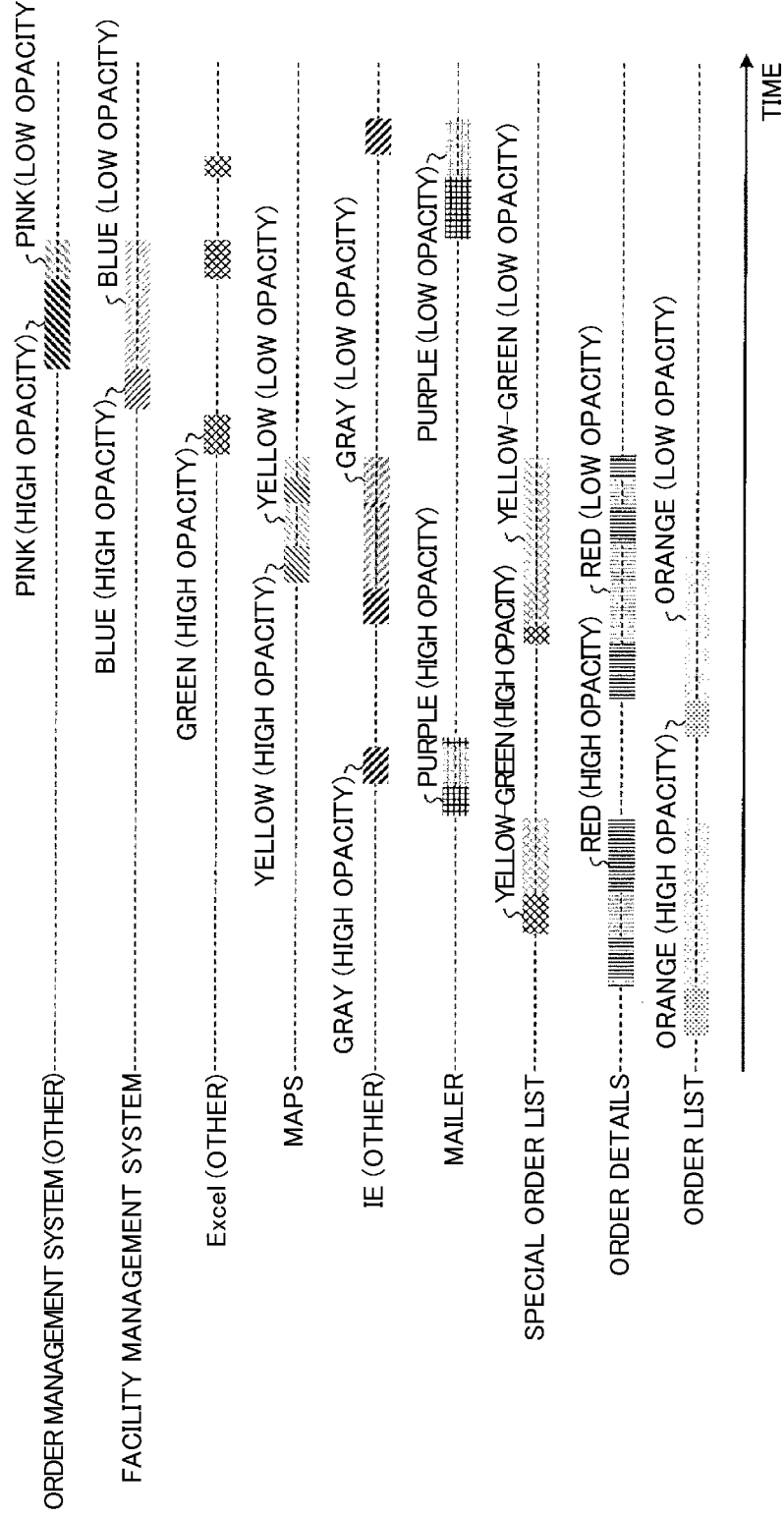
FIG. 22 is a view showing an example timeline display reflecting grouping results shown in FIGS. 13 and 14 in y-axis positions and colors.

Note that FIG. 22 is a view showing an example timeline display reflecting the grouping results shown in FIGS. 13 and 14 in the y-axis positions and colors. Thus, timelines corresponding respectively to the group units (see the frame W1) shown in FIG. 13 can be visualized.

Example 2

Figure 25:
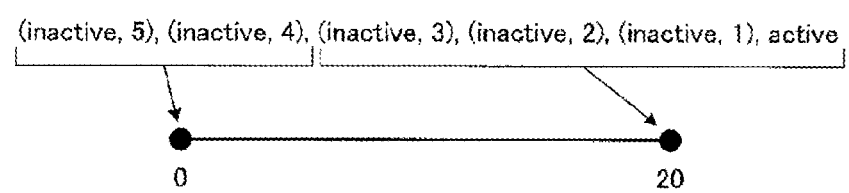
FIG. 25 is a view illustrating correspondences between respective window states and size parameters.
Figure 28:
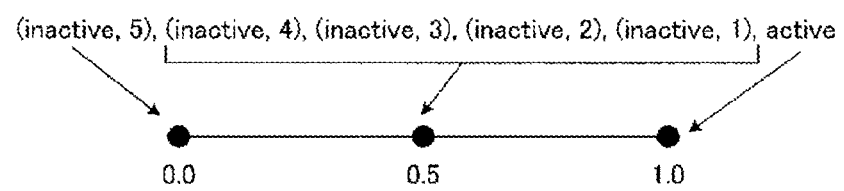
FIG. 28 is a view illustrating correspondences between respective window states and opacity parameters.

Next, in example 2, an example in which the number of groups of the size (corresponding to the attribute value of the y-axis direction width), among the visual variables, is modified to "2" will be described. FIG. 23 is a view showing an example data configuration of the attribute value mapping rule 113. FIGS. 24, 26, and 27 are views showing example data configurations of the visual variable setting rule 114. FIG. 25 is a view illustrating correspondences between respective window states and size parameters. FIG. 28 is a view illustrating correspondences between respective window states and opacity parameters.

In example 2, the display control unit 13 sets the size group at "2" (see the first row of an attribute value mapping rule 113b in FIG. 23), maps two values, namely "0" and "20", thereto (see a visual variable setting rule 114a-2 in FIG. 24), and assigns window state elements respectively thereto. More specifically, as shown in FIG. 25, in example 2, the display control unit 13 divides the size group into the following two groups using a window exposure ratio of "25%" as a threshold, and applies "20" to the former group and "0" to the latter group in order as the size (see FIG. 25). Here, the former group is a group including "active", "(inactive, 1)", "(inactive, 2)", and "(inactive, 3)". Further, the latter group is a group including "(inactive, 4)" and "(inactive, 5)". Note that the hue distribution and the opacity are set similarly to example 1 using the same rules as example 1, as shown in FIGS. 26 to 28.

Figure 29:
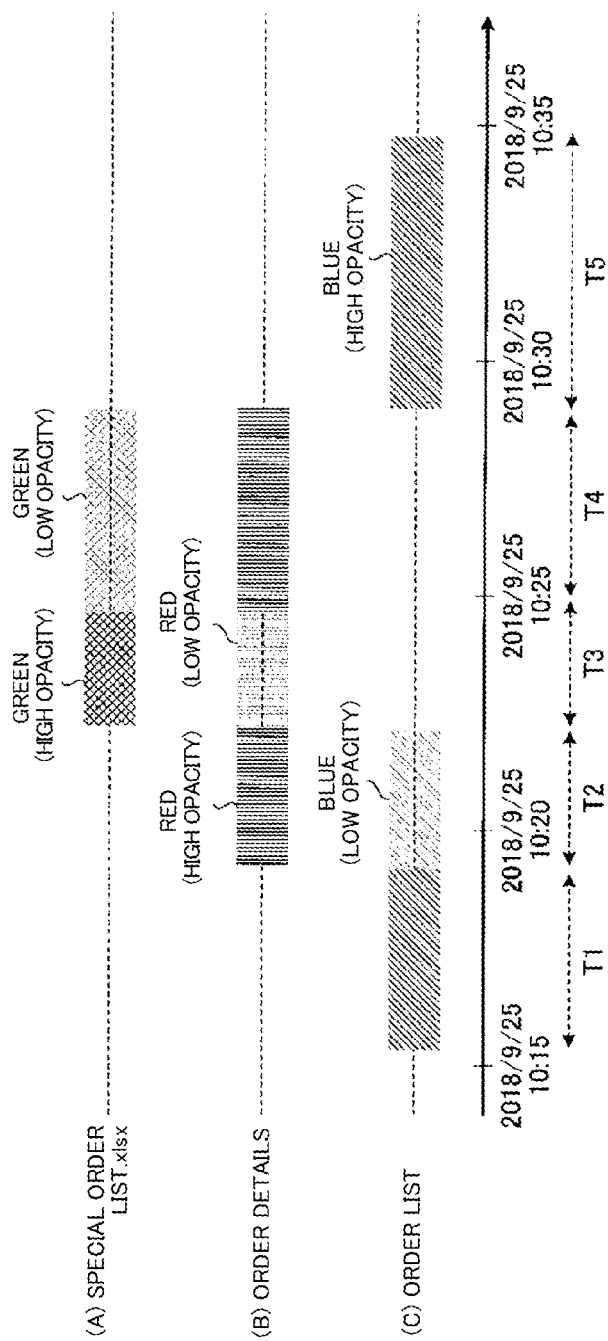
FIG. 29 is a view showing an example of a case in which the content of the operation logs in the operation log file shown in FIGS. 7 and 8 is visualized in a timeline format.

FIG. 29 is a view showing an example of a case in which the content of the operation logs in the operation log file shown in FIGS. 7 and 8 is visualized in a timeline format. In FIG. 29, the timelines are drawn in accordance with the attribute value mapping rule 113b and visual variable setting rules 114a-2, 114b-2, and 114c-2.

In example 2, the size is set at two values, and therefore, as shown in FIG. 29, when the window state is "active", "(inactive, 1)", "(inactive, 2)", or "(inactive, 3)", rectangular objects are formed. When the window state is "(inactive, 4)" or "(inactive, 5)", on the other hand, rectangular objects are not displayed. Note that since the opacity is displayed so as to be divided into 3 levels, similarly to an example, when the window state is "active", the opacity of the rectangular object increases, and when the window state is "(inactive, 1)", "(inactive, 2)", or "(inactive, 3)", the opacity decreases.

Thus, in example 2, using a window exposure ratio of "25%" as a threshold, it is possible to acquire a result in which rectangles indicating the non-referenced state are displayed according to the presence or absence of width in the y-axis direction. Hence, in embodiment 2, the user can switch the representation method simply by modifying the number of groups, without implementing a special feature for eliminating display.

Example 3

Next, example 3 will be described. FIG. 30 is a view showing an example data configuration of the attribute value mapping rule 113. FIGS. 31 to 33 are views showing example data configurations of the visual variable setting rule 114.

Figure 34:
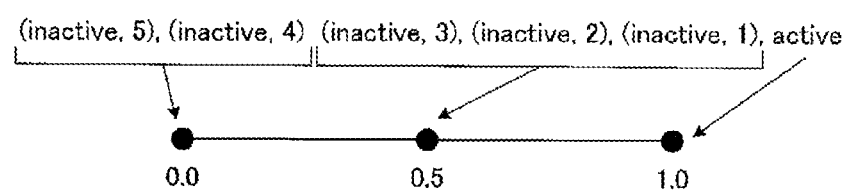
FIG. 34 is a view illustrating correspondences between respective window states and opacity parameters.

FIG. 34 is a view illustrating correspondences between respective window states and opacity parameters.

As shown by an attribute value mapping rule 113c in FIG. 30, in example 3, a case in which the attribute value indicating the data variable of the window state (the number of groups "2"), within the attribute value mapping rule 113b (see FIG. 23), is modified from the width in the y-axis direction (the size) to the type of border (the texture) will be described.

FIG. 31 shows a visual variable setting rule 114d-3 indicating texture categories (groups) and corresponding window states and set values. As shown by the visual variable setting rule 114d-3, during texture setting, a pattern is prepared in advance using a number of ranges in which an object can be differentiated from another object (i.e. in which selectivity can be maintained) as an upper limit, and mapping is performed in accordance with the set number of groups. As the number of ranges in which an object can be differentiated from another object (i.e. in which selectivity can be maintained), there are typically approximately four types (more specifically, see reference document 3 "M. Sheelagh, T. Carpendale, "Considering Visual Variables as a Basis for Information Visualisation", 2003.").

In example 3, the display control unit 13 divides the texture category into two groups using a window exposure ratio of "25%" as a threshold, and applies "none" to the former group and "dotted lines" to the latter group in order as the texture (see FIG. 31). Here, the former group is a group including "active", "(inactive, 1)", "(inactive, 2)", and "(inactive, 3)". Further, the latter group is a group including "(inactive, 4)" and "(inactive, 5)". Note that the hue distribution and the opacity are set as shown in FIGS. 32 to 34. The opacity is divided into 3 groups, namely "active", a group including "(inactive, 1)", "(inactive, 2)", and "(inactive, 3)", and a group including "(inactive, 4)" and "(inactive, 5)", and "1.0", "0.5", and "0.0" are applied thereto in order (see FIGS. 33 and 34). Note that the hue distribution is set in a similar manner to example 1 using the same rule as example 1, as shown in FIG. 32.

Figure 35:
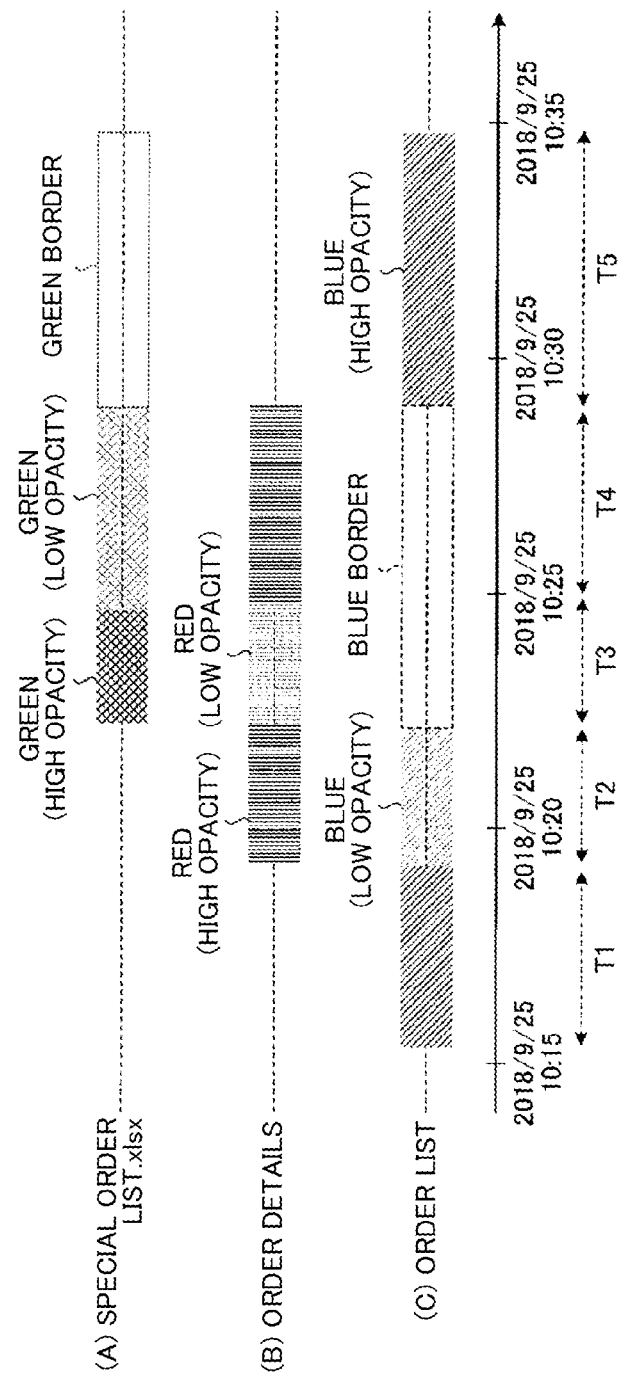
FIG. 35 is a view showing an example of a case in which the content of the operation logs in the operation log file shown in FIGS. 7 and 8 is visualized in a timeline format.

FIG. 35 is a view showing an example of a case in which the content of the operation logs in the operation log file shown in FIGS. 7 and 8 is visualized in a timeline format. In FIG. 35, the timelines are drawn in accordance with the attribute value mapping rule 113c and visual variable setting rules 114d-3, 114b-3, and 114c-3.

In example 3, as shown in FIG. 35, transparent rectangular objects surrounded by a dotted-line border are displayed in relation to the window states "(inactive, 5)" and "(inactive, 4)" (the non-referenced state), in which the opacity is "0.0". Hence, by adjusting the texture in accordance with the visual variable setting rule 114a-3, as in example 3, the user can acquire a result indicating whether or not a window is in the non-referenced state by displaying the rectangular objects according to the presence or absence of a border.

As illustrated by examples 1 to 3, the user can modify the number of groups, the set values, and the elements assigned thereto. In other words, the user can modify the settings of the attribute value mapping rule and the visual variable setting rule. In so doing, the user can easily modify the attribute values of the objects and thereby switch the visualized timeline in accordance with his/her aims.

Note that in examples 1 to 3, cases in which the visual variable setting rule includes both a rule for grouping the attribute values and a rule for mapping the visual variable values were described as examples, but the present invention is not limited thereto. For example, the rule for grouping the attribute values and the rule for mapping the visual variable values may be provided in a separable manner so that the user can adjust only one of the rules. In this case, when the visual variable assignment is changed but the method of dividing the visual variables remains the same, it is not necessary to recalculate everything up to the projection method onto the value range.

Further, the window exposure ratio used in examples 1 to 3 is one index for estimating whether a window is in the referenceable state or the non-referenced state. Therefore, by employing a gaze status of each window, which is acquired using a line-of-sight measurement device, a mouse trajectory, or the like in addition to the window exposure ratio, the precision with which the window state is determined can be improved.

Effects of Embodiment

In this embodiment, as described above, an operation log is visualized in a timeline format in order to ascertain the combined usage status of windows. Further, in this embodiment, visualization can be performed in a timeline format that takes into consideration the referenceable state and the non-referenced state as well as the active state as window states. Moreover, in this embodiment, the active state and the inactive state are distinguished from the log type and reflected in the visual variables.

More specifically, in this embodiment, the window exposure ratio is discretized and an exposure ratio level is set for each discrete range, whereupon the data variables indicating the window states are set. Then, by having the user adjust the mapping from the data variables onto the attribute values, the referenceable state and the non-referenced state can be expressed in a distinguishable manner in the visualization result.

Hence, according to this embodiment, an actual work situation, including the combined usage status of windows in the referenceable state, can be ascertained in relation to complex work in which a plurality of windows, such as business systems and documents, are used in combination.

Further, in this embodiment, the user can adjust a general-purpose model (the files and rules stored in the storage unit 11) used for grouping the subject elements and grouping the attribute values in accordance with his/her aims and so on.

More specifically, when grouping the subject elements, the data can be hierarchized in accordance with the interests of the user, such as the applications, the systems or categories, or the windows, and the elements can be defined at the granularity that the user wishes to distinguish in the visualization result. Then, by employing the lowest level to which each element belongs as the grouping unit, the data can be listed at different granularities corresponding to the wishes of the user.

Similarly, when grouping the attribute values, the visual variables can be defined at the granularity that the user wishes to distinguish in the visualization result while varying the number of groups of the visual variables that are converted into attribute values of the objects and mapping thereof. Then, by employing the value range in which each attribute value is discretized as the grouping unit, the data can be visualized at different granularities corresponding to the visual impressions and wishes of the user.

In other words, according to this embodiment, the user can easily select data variables and set a mapping operation even when a complex actual work situation in which inactive states are handled is to be expressed in the visualization result. Moreover, in this embodiment, information can be listed at a granularity corresponding to the interests of the user, such as the analysis viewpoint and the target business, and analyzed in a multifaceted manner.

Hence, according to this embodiment, a complex actual work situation can be visualized at a granularity that is suitable for purpose while reflecting the window state on the terminal screen.

The configuration of this embodiment is not limited to visualization using windows (the subject) and exposure ratios (the attribute) as specific domains, as in the examples, and also includes configurations and effects not present in generally known visualization techniques.

As a configuration of this embodiment, the conversion unit 12 executes window state conversion and conversion into discrete values, both of which require considerable processing time, as a first stage (the first conversion unit 121), and executes grouping, which requires a shorter processing time, as a second stage (the second conversion unit 122). As a result, an effect is achieved in that the operation performed repetitively by the user to modify the grouping while checking the actual results of listing/visualization can be implemented without compromising the interactivity of the software system.

Furthermore, in the prior art, the processing other than visual variable setting is all handled by the same conversion unit. In this embodiment, however, the subject elements and value ranges are extracted in the first stage of the conversion unit 12 at any granularity unit that the user can conceive of, regardless of the viewpoint. Here, the first stage of the conversion unit 12 refers to the first conversion unit 121 that performs window state conversion and conversion into discrete values. Further, in the second stage of the conversion unit 12, the information is grouped at a granularity that facilitates viewing by the user in accordance with the viewpoint. Here, the second stage of the conversion unit 12 refers to the second conversion unit 122 that performs grouping. Hence, even when the user frequently changes the viewpoint, the first conversion unit 121 constituting the first stage serves as the part that converts fixed data regardless of the viewpoint, and as a result, the following effect is achieved. In this effect, there is no need to be aware of the first conversion unit 121 constituting the first stage, and the range to be aware of is easy to grasp through trial and error. Hence, work efficiency is improved, and the degree of freedom desired by the user is not impaired.

Note that generally, the information handled by a visualization technique is a combination of a subject and an attribute. This embodiment provides coherent means for these two types of information and can be applied to a software system based on general-purpose, easy-to-understand concepts likewise for the purpose of visualization in other domains. The application range thereof is wide.

System Configuration of Embodiment

The constituent elements of the display control device 10 shown in FIG. 2 are functional concepts, and the display control device 10 does not necessarily have to have the physical configuration shown in the figure. In other words, the specific form in which the functions of the display control device 10 are dispersed and integrated is not limited to that shown in the figure, and all or some thereof may be functionally or physically dispersed or integrated in arbitrary units in accordance with various loads, usage statuses, and so on.

Further, the processing performed in the display control device 10 may be wholly or partially realized by a CPU, a GPU (Graphics Processing Unit), and a program that is analyzed and executed by the CPU and the GPU. The processing performed in the display control device 10 may also be realized as hardware formed by wired logic.

Furthermore, in the processing described in the embodiment, all or a part of the processing described as being performed automatically may be performed manually. Alternatively, all or a part of the processing described as being performed manually may be performed automatically using well-known methods. In addition, the processing procedures, control procedures, specific names, and information including various data and parameters described above and shown in the figures may be modified appropriately, unless specified otherwise.

[Program]

Figure 36:
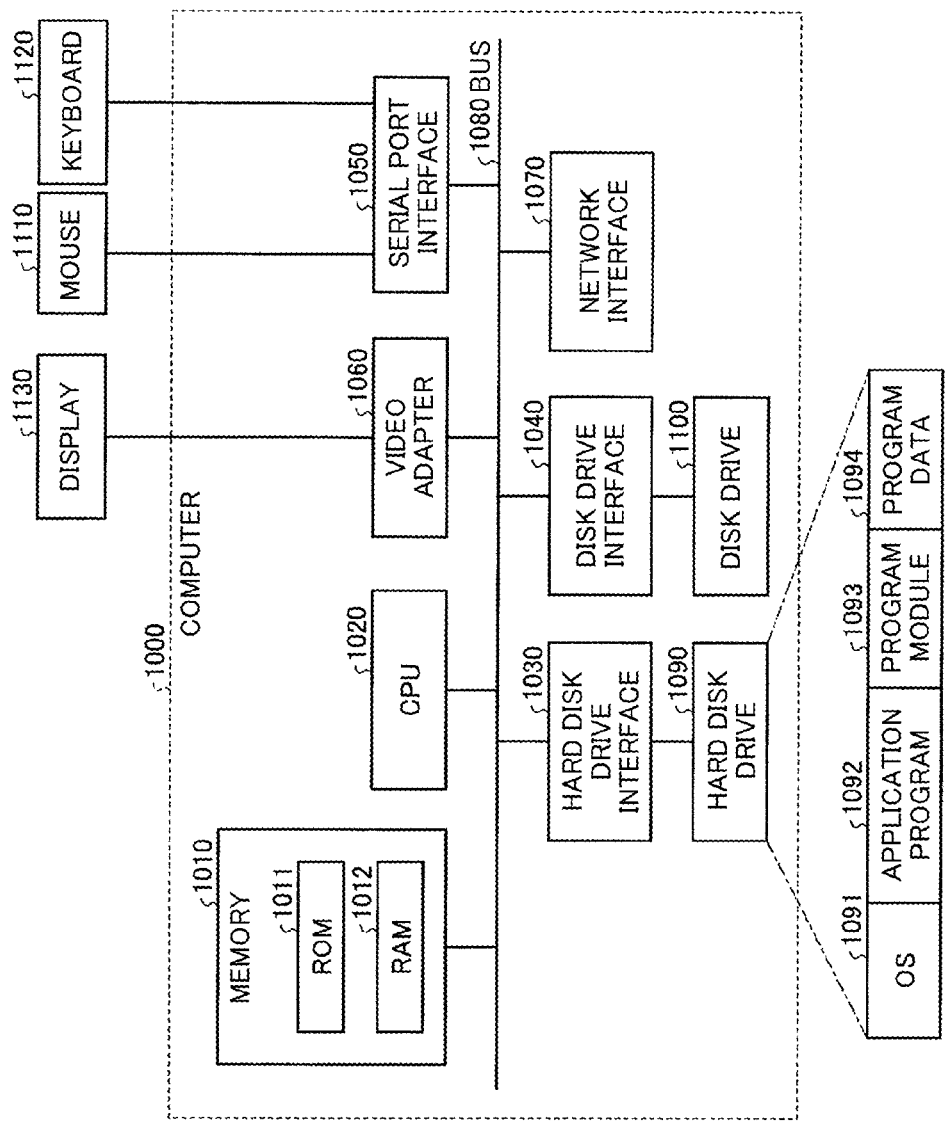
FIG. 36 is a view showing an example of a computer on which a program is executed in order to realize the display control device.

FIG. 36 is a view showing an example of a computer on which a program is executed in order to realize the display control device 10. A computer 1000 includes, for example, a memory 1010 and a CPU 1020. The computer 1000 also includes a hard disk drive interface 1030, a disk drive interface 1040, a serial port interface 1050, a video adapter 1060, and a network interface 1070. These respective parts are connected by a bus 1080.

The memory 1010 includes a ROM 1011 and a RAM 1012. The ROM 1011 stores a boot program such as a BIOS (Basic Input Output System), for example. The hard disk drive interface 1030 is connected to a hard disk drive 1090. The disk drive interface 1040 is connected to a disk drive 1100. A removable storage medium such as a magnetic disk or an optical disk, for example, is inserted into the disk drive 1100. The serial port interface 1050 is connected to a mouse 1110 and a keyboard 1120, for example. The video adapter 1060 is connected to a display 1130, for example.

The hard disk drive 1090 stores an OS (Operating System) 1091, an application program 1092, a program module 1093, and program data 1094, for example. In other words, a program defining the processing of the display control device 10 is packaged as the program module 1093, which describes code that can be executed by the computer 1000. The program module 1093 is stored in the hard disk drive 1090, for example. For example, the program module 1093 stored in the hard disk drive 1090 is used to execute similar processing to the functional configuration of the display control device 10. Note that an SSD (Solid State Drive) may be substituted for the hard disk drive 1090.

Further, the setting data used in the processing of the embodiment described above are stored in the memory 1010 or the hard disk drive 1090, for example, as the program data 1094. The CPU 1020 reads the program module 1093 and the program data 1094 stored in the memory 1010 or the hard disk drive 1090 to the RAM 1012 as required and executes the read program module and program data.

Note that the program module 1093 and the program data 1094 are not limited to being stored in the hard disk drive 1090 and may be stored on a removable storage medium, for example, and read by the CPU 1020 via the disk drive 1100 or the like. Alternatively, the program module 1093 and the program data 1094 may be stored in another computer connected via a network (a LAN (Local Area Network), a WAN (Wide Area Network), or the like). The program module 1093 and the program data 1094 may then be read from the other computer by the CPU 1020 via the network interface 1070.

An embodiment of the invention designed by the present inventors was described above, but the present invention is not limited by the description and illustrations of this embodiment, which form a part of the disclosure of the present invention. In other words, other embodiments, examples, application techniques, and so on that could be implemented by a person skilled in the art or the like on the basis of this embodiment are all included in the scope of the present invention.

REFERENCE SIGNS LIST

2 Database (DB)
3 Output device
10 Display control device
11 Storage unit
12 Conversion unit
13 Display control unit 14 Visualization unit
111 Window state setting file
112 Grouping setting file
113 Attribute value mapping rule
114 Visual variable setting rule

The invention claimed is:

1. A display control device comprising:
one or more processors configured to: upon receipt of an operation log file including operation logs that indicate content of operations performed on windows on a terminal screen, determine data variables representing window states of the windows indicated by each of the operation logs on a basis of a window state setting file for setting a window state on the terminal screen,
wherein the window states of the windows comprise inactive states or active states during different time periods, and
wherein the inactive state of a window corresponds to an exposure ratio level;
set correspondence relationships between the data variables and visual variables, generate objects for the windows corresponding to the data variables, and determine attribute values of the objects on a basis of the visual variables associated with the data variables, wherein the attribute values of the objects reflect the window states of the corresponding windows during the different time periods that comprise the active states, and the inactive states with the corresponding exposure ratio levels; and
perform drawing on a basis of sets of the objects and the attribute values.

2. The display control device according to claim 1, wherein the window state is either an inactive state which denotes windows that are displayed on a desktop and referenced but are not activated or windows that are hidden behind other windows and therefore not referenced, or an active state which denotes activated windows.

3. The display control device according to claim 1, wherein the one or more processors are configured to group elements of the windows indicated by the respective operation logs into group units on a basis of a grouping setting file for setting the grouping of elements of the windows on the terminal screen, and determine data variables representing the group units of the grouped elements.

4. The display control device according to claim 3, wherein, in the grouping setting file, a number of groups, the group units, and the elements assigned to the respective groups are modifiable.

5. The display control device according to claim 1, wherein the data variable assigned to each visual variable, a number of groups, and set values are modifiable.

6. The display control device according to claim 1, wherein, when a window indicated by the operation log is in an inactive state, the one or more processors are configured to discretize a window exposure ratio into a specific number of divisions, set each discrete value as an exposure ratio level, and determine a group including the inactive state and the exposure ratio level as the data variable indicating the window state.

7. A display control method executed by a display control device, comprising the steps of:
determining, upon receipt of an operation log file including operation logs that indicate content of operations performed on windows on a terminal screen, data variables representing window states of the windows indicated by each of the operation logs on a basis of a window state setting file for setting a window state on the terminal screen,
wherein the window states of the windows comprise inactive states or active states during different time periods, and
wherein the inactive state of a window corresponds to an exposure ratio level;
setting correspondence relationships between the data variables and visual variables, generating objects for the windows corresponding to the data variables, and determining attribute values of the objects on a basis of the visual variables associated with the data variables, wherein the attribute values of the objects reflect the window states of the corresponding windows during the different time periods that comprise the active states, and the inactive states with the corresponding exposure ratio levels; and
performing drawing on a basis of sets of the objects and the attribute values.

8. The display control method according to claim 7, wherein the window state is either an inactive state which denotes windows that are displayed on a desktop and referenced but are not activated or windows that are hidden behind other windows and therefore not referenced, or an active state which denotes activated windows.

9. The display control method according to claim 7, further comprising:
grouping elements of the windows indicated by the respective operation logs into group units on a basis of a grouping setting file for setting the grouping of elements of the windows on the terminal screen, and determining data variables representing the group units of the grouped elements.

10. The display control method according to claim 9, wherein, in the grouping setting file, a number of groups, the group units, and the elements assigned to the respective groups are modifiable.

11. The display control method according to claim 7, wherein the data variable assigned to each visual variable, a number of groups, and set values are modifiable.

12. The display control method according to claim 7, further comprising:
when a window indicated by the operation log is in an inactive state,
discretizing a window exposure ratio into a specific number of divisions,
setting each discrete value as an exposure ratio level, and
determining a group including the inactive state and the exposure ratio level as the data variable indicating the window state.

13. A non-transitory computer readable medium storing one or more instructions that cause a computer to execute the steps of:
determining, upon receipt of an operation log file including operation logs that indicate content of operations performed on windows on a terminal screen, data variables representing window states of the windows indicated by each of the operation logs on a basis of a window state setting for setting a window state on the terminal screen,
wherein the window states of the windows comprise inactive states or active states during different time periods, and
wherein the inactive state of a window corresponds to an exposure ratio level;

setting correspondence relationships between the data variables and visual variables, generating objects for the windows corresponding to the data variables, and determining attribute values of the objects on a basis of the visual variables associated with the data variables, wherein the attribute values of the objects reflect the window states of the corresponding windows during the different time periods that comprise the active states, and the inactive states with the corresponding exposure ratio levels; and performing drawing on a basis of sets of the objects and the attribute values.

14. The non-transitory computer readable medium according to claim 13, wherein the window state is either an inactive state which denotes windows that are displayed on a desktop and referenced but are not activated or windows that are hidden behind other windows and therefore not referenced, or an active state which denotes activated windows.

15. The non-transitory computer readable medium according to claim 13, wherein the one or more instructions further cause the computer to execute the steps of:

grouping elements of the windows indicated by the respective operation logs into group units on a basis of a grouping setting file for setting the grouping of elements of the windows on the terminal screen, and determining data variables representing the group units of the grouped elements.

16. The non-transitory computer readable medium according to claim 15, wherein, in the grouping setting file, a number of groups, the group units, and the elements assigned to the respective groups are modifiable.

17. The non-transitory computer readable medium according to claim 13, wherein the data variable assigned to each visual variable, a number of groups, and set values are modifiable.

18. The non-transitory computer readable medium according to claim 13, wherein the one or more instructions further cause the computer to execute the steps of:

when a window indicated by the operation log is in an inactive state, discretizing a window exposure ratio into a specific number of divisions, setting each discrete value as an exposure ratio level, and determining a group including the inactive state and the exposure ratio level as the data variable indicating the window state.

* * * * *